United States Patent
Sherrill et al.

(10) Patent No.: US 9,670,832 B2
(45) Date of Patent: Jun. 6, 2017

(54) THRUST ABSORBING PLANETARY TRACTION DRIVE SUPERTURBO

(71) Applicant: VANDYNE SUPERTURBO, INC., Loveland, CO (US)

(72) Inventors: Ryan Sherrill, Loveland, CO (US); Sterling Holman, Loveland, CO (US); Jared William Brown, Loveland, CO (US); Marc Montgomery, Loveland, CO (US)

(73) Assignee: VanDyne SuperTurbo, Inc., Loveland, CO (US)

( * ) Notice: Subject to any disclaimer, the term of this patent is extended or adjusted under 35 U.S.C. 154(b) by 151 days.

(21) Appl. No.: 14/511,250

(22) Filed: Oct. 10, 2014

(65) Prior Publication Data
US 2015/0141188 A1    May 21, 2015

Related U.S. Application Data

(60) Provisional application No. 61/906,938, filed on Nov. 21, 2013.

(51) Int. Cl.
*F02B 37/10* (2006.01)
*F16H 47/08* (2006.01)
(Continued)

(52) U.S. Cl.
CPC .......... *F02B 37/105* (2013.01); *F16H 47/04* (2013.01); *F16H 47/065* (2013.01); *F16H 47/08* (2013.01); *F16H 13/06* (2013.01); *Y02T 10/144* (2013.01)

(58) Field of Classification Search
None
See application file for complete search history.

(56) References Cited

U.S. PATENT DOCUMENTS

| 236,150 A | 1/1881 | Fitch |
| 1,526,493 A | 2/1925 | Dolton |

(Continued)

FOREIGN PATENT DOCUMENTS

| EP | 0517675 | 8/1995 |
| EP | 1400667 | 3/2004 |

(Continued)

OTHER PUBLICATIONS

U.S. Appl. No. 12/536,421, filed Aug. 5, 2009.

(Continued)

*Primary Examiner* — Derek D Knight
*Assistant Examiner* — Timothy M Hannon
(74) *Attorney, Agent, or Firm* — William W. Cochran; Cochran Freund & Young LLC

(57) ABSTRACT

Disclosed are embodiments of thrust absorbing planetary traction drives that utilize roller-shaft traction interfaces that are slanted to absorb thrust created on a turbo shaft by a turbine or compressor. Slanted traction surfaces on the sun portion of the turbo shaft are slanted inwardly so that the turbo shaft remains centered in the planetary traction drive. Either double roller planets or single roller planets can be used to absorb thrust in the axial direction of the turbo shaft. Various curved and slanted surfaces can be utilized to create traction interfaces that hold and stabilize the turbo shaft both axially and radially.

14 Claims, 18 Drawing Sheets

(51) Int. Cl.
 *F16H 47/04* (2006.01)
 *F16H 47/06* (2006.01)
 *F16H 13/06* (2006.01)

(56) References Cited

U.S. PATENT DOCUMENTS

| | | | |
|---|---|---|---|
| 1,550,796 A | 8/1925 | Gammons |
| 1,686,446 A | 10/1928 | Gilman |
| 1,691,625 A | 11/1928 | Chilton |
| 1,718,846 A | 6/1929 | Arter |
| 1,979,170 A | 10/1934 | Nardone |
| 2,076,057 A | 4/1937 | Almen |
| 2,173,595 A | 9/1939 | Schutte |
| 2,216,494 A | 10/1940 | Kurtz et al. |
| 2,278,181 A | 3/1942 | Lieberherr |
| 2,397,941 A | 4/1946 | Birkigt |
| 2,412,351 A | 12/1946 | Mount |
| 2,542,539 A | 2/1951 | Kuhrt et al. |
| 2,573,258 A | 10/1951 | Gerritsen |
| 2,585,698 A | 2/1952 | Schneider |
| 2,585,968 A | 2/1952 | Schneider |
| 2,585,986 A | 2/1952 | Andreasson |
| 2,586,725 A | 2/1952 | Schottler |
| 2,590,800 A | 3/1952 | Stephenson |
| 2,620,621 A | 12/1952 | Nettel |
| 2,652,006 A | 9/1953 | Simonson |
| 2,696,888 A | 12/1954 | Chillson et al. |
| 2,701,970 A | 2/1955 | Kraus |
| 2,803,507 A | 8/1957 | Mempel et al. |
| 2,874,592 A | 2/1959 | Oehrli |
| 2,878,692 A | 3/1959 | Wolf |
| 2,901,924 A | 9/1959 | Banker |
| 2,905,026 A | 9/1959 | Oehrli |
| 2,913,932 A | 11/1959 | Oehrli |
| 2,941,422 A | 6/1960 | Barish |
| 2,973,671 A | 3/1961 | Elkins |
| 3,035,460 A | 5/1962 | Guichard |
| 3,044,683 A | 7/1962 | Woollenweber |
| 3,163,984 A | 1/1965 | Dumont |
| 3,203,278 A | 8/1965 | General |
| 3,237,468 A | 3/1966 | Schottler |
| 3,246,531 A | 4/1966 | Kashihara |
| 3,248,960 A | 5/1966 | Schottler |
| 3,293,945 A | 12/1966 | Stockton |
| 3,420,122 A | 1/1969 | Okabe |
| 3,423,927 A | 1/1969 | Scherenberg |
| 3,494,224 A | 2/1970 | Fellows et al. |
| 3,504,574 A | 4/1970 | Okabe |
| 3,673,797 A | 7/1972 | Wilkinson |
| 3,676,999 A | 7/1972 | Oldfield |
| 3,707,888 A | 1/1973 | Schottler |
| 3,745,844 A | 7/1973 | Schottler |
| 3,793,907 A | 2/1974 | Nakamura et al. |
| 3,988,894 A | 11/1976 | Melchior |
| 4,052,915 A | 10/1977 | Kraus |
| 4,089,569 A | 5/1978 | Rempel |
| 4,215,549 A | 8/1980 | Daeschner |
| 4,270,400 A | 6/1981 | Fodor |
| 4,287,791 A | 9/1981 | Numazawa et al. |
| 4,312,183 A | 1/1982 | Regar |
| 4,314,485 A | 2/1982 | Adams |
| 4,345,486 A | 8/1982 | Olesen |
| 4,378,677 A | 4/1983 | Zumstein |
| 4,398,436 A | 8/1983 | Fisher |
| 4,424,726 A | 1/1984 | Galbraith |
| 4,449,370 A | 5/1984 | Ream |
| 4,489,992 A | 12/1984 | Brandenstein et al. |
| 4,541,305 A | 9/1985 | Hamabe |
| 4,570,501 A | 2/1986 | de Bris Perry |
| 4,592,247 A | 6/1986 | Mutschler |
| 4,593,574 A | 6/1986 | Sinn et al. |
| 4,616,481 A | 10/1986 | Melchior et al. |
| 4,667,525 A | 5/1987 | Schottler |
| 4,693,134 A | 9/1987 | Kraus |
| 4,700,542 A | 10/1987 | Wang |
| 4,718,781 A | 1/1988 | Gerard |
| 4,729,225 A | 3/1988 | Bucher |
| 4,856,374 A | 8/1989 | Kreuzer |
| 5,025,671 A | 6/1991 | Kraus |
| 5,033,269 A | 7/1991 | Smith |
| 5,037,361 A | 8/1991 | Takahashi |
| 5,385,514 A | 1/1995 | Dawe |
| 5,397,279 A | 3/1995 | McCotter, Jr. |
| 5,458,855 A | 10/1995 | Gillbrand |
| 5,551,929 A | 9/1996 | Fritsch |
| 5,560,207 A | 10/1996 | Ramsden et al. |
| 5,586,540 A | 12/1996 | Marzec et al. |
| 5,713,204 A | 2/1998 | Kadlicko |
| 5,724,813 A | 3/1998 | Fenelon et al. |
| 5,729,978 A | 3/1998 | Hiereth et al. |
| 5,775,417 A | 7/1998 | Council |
| 5,887,434 A | 3/1999 | Arnell et al. |
| 5,974,792 A | 11/1999 | Isobe |
| 6,041,602 A | 3/2000 | Dickey |
| 6,050,094 A | 4/2000 | Udd et al. |
| 6,050,095 A | 4/2000 | Blake |
| 6,095,940 A | 8/2000 | Ai et al. |
| 6,145,313 A | 11/2000 | Arnold |
| 6,227,180 B1 | 5/2001 | Hoffmann et al. |
| 6,343,473 B1 | 2/2002 | Kanesaka |
| 6,406,399 B1 | 6/2002 | Ai |
| 6,408,626 B1 | 6/2002 | Arnell |
| 6,470,864 B2 | 10/2002 | Kim et al. |
| 6,601,388 B1 | 8/2003 | Gladden |
| 6,651,432 B1 | 11/2003 | Gray, Jr. |
| 6,681,574 B2 | 1/2004 | Berglund et al. |
| 6,725,653 B2 | 4/2004 | Brown et al. |
| 6,729,315 B2 | 5/2004 | Onodera et al. |
| 6,857,263 B2 | 2/2005 | Gray, Jr. et al. |
| 6,871,498 B1 | 3/2005 | Allen et al. |
| 6,912,852 B2 | 7/2005 | Gottemoller et al. |
| 6,960,147 B2 | 11/2005 | Kolstrup |
| 6,994,531 B2 | 2/2006 | Dairokuno et al. |
| 7,025,042 B2 | 4/2006 | Gray, Jr. |
| 7,032,382 B2 | 4/2006 | Onodera et al. |
| 7,055,507 B2 | 6/2006 | Kelley, Jr. |
| 7,237,532 B2 | 7/2007 | Gray, Jr. |
| 7,455,617 B2 | 11/2008 | Miller et al. |
| 7,491,149 B2 | 2/2009 | Greenwood et al. |
| 7,492,594 B2 | 2/2009 | Pal |
| 7,540,818 B2 | 6/2009 | Miller et al. |
| 8,062,161 B2 | 11/2011 | Marumoto |
| 8,608,609 B2 | 12/2013 | Sherrill et al. |
| 8,668,614 B2 | 3/2014 | Sherrill et al. |
| 2003/0196436 A1 | 10/2003 | Hoecker et al. |
| 2005/0277514 A1 | 12/2005 | Hiroyuki et al. |
| 2006/0032225 A1 | 2/2006 | VanDyne |
| 2006/0070382 A1 | 4/2006 | Karlsson |
| 2006/0157291 A1 | 7/2006 | Puiu et al. |
| 2007/0062189 A1 | 3/2007 | Keppeler et al. |
| 2007/0130094 A1 | 6/2007 | Lien et al. |
| 2007/0130946 A1 | 6/2007 | Winsor et al. |
| 2007/0130948 A1 | 6/2007 | Boehm et al. |
| 2007/0197337 A1 | 8/2007 | Miller et al. |
| 2007/0275809 A1 | 11/2007 | Miller et al. |
| 2008/0141810 A1 | 6/2008 | Miller et al. |
| 2008/0236150 A1 | 10/2008 | Jarvi |
| 2008/0276756 A1 | 11/2008 | Marumoto |
| 2008/0282699 A1 | 11/2008 | Barthelet et al. |
| 2009/0277431 A1 | 11/2009 | Nitzke et al. |
| 2010/0031935 A1 | 2/2010 | VanDyne et al. |
| 2010/0174456 A1 | 7/2010 | Beaudoin et al. |
| 2010/0236503 A1 | 9/2010 | Bernt et al. |
| 2012/0165151 A1* | 6/2012 | Sherrill ............... F02D 41/0007 475/114 |

FOREIGN PATENT DOCUMENTS

| | | |
|---|---|---|
| EP | 01300946 | 12/2004 |
| EP | 0994245 | 6/2005 |
| EP | 1550796 | 7/2005 |
| EP | 1711699 | 3/2007 |
| GB | 0206845 | 2/1924 |
| GB | 557970 | 12/1943 |

(56) References Cited

FOREIGN PATENT DOCUMENTS

| | | |
|---|---|---|
| JP | 61164039 | 7/1986 |
| JP | 3153947 | 7/1991 |
| WO | 2006022635 | 3/2006 |
| WO | 2008008379 | 1/2008 |
| WO | 2011011019 | 1/2011 |
| WO | 2012170001 | 12/2012 |

OTHER PUBLICATIONS

U.S. Appl. No. 61/086,401, filed Aug. 5, 2008.
U.S. Appl. No. 61/231,628, filed Aug. 5, 2009.
International Search Report, mailed May 4, 2012, in PCT Application Serial No. PCT/US2012/021932.
International Search Report, mailed May 4, 2012, in PCT Application Serial No. PCT/US11/67151.
International Search Report, mailed May 4, 2012, in PCT Application Serial No. PCT/US10/23398.
International Search Report, mailed May 4, 2012, in PCT Application Serial No. PCT/US09/51742.
International Search Report, mailed May 4, 2012, in PCT Application Serial No. PCT/US11/22298.

* cited by examiner

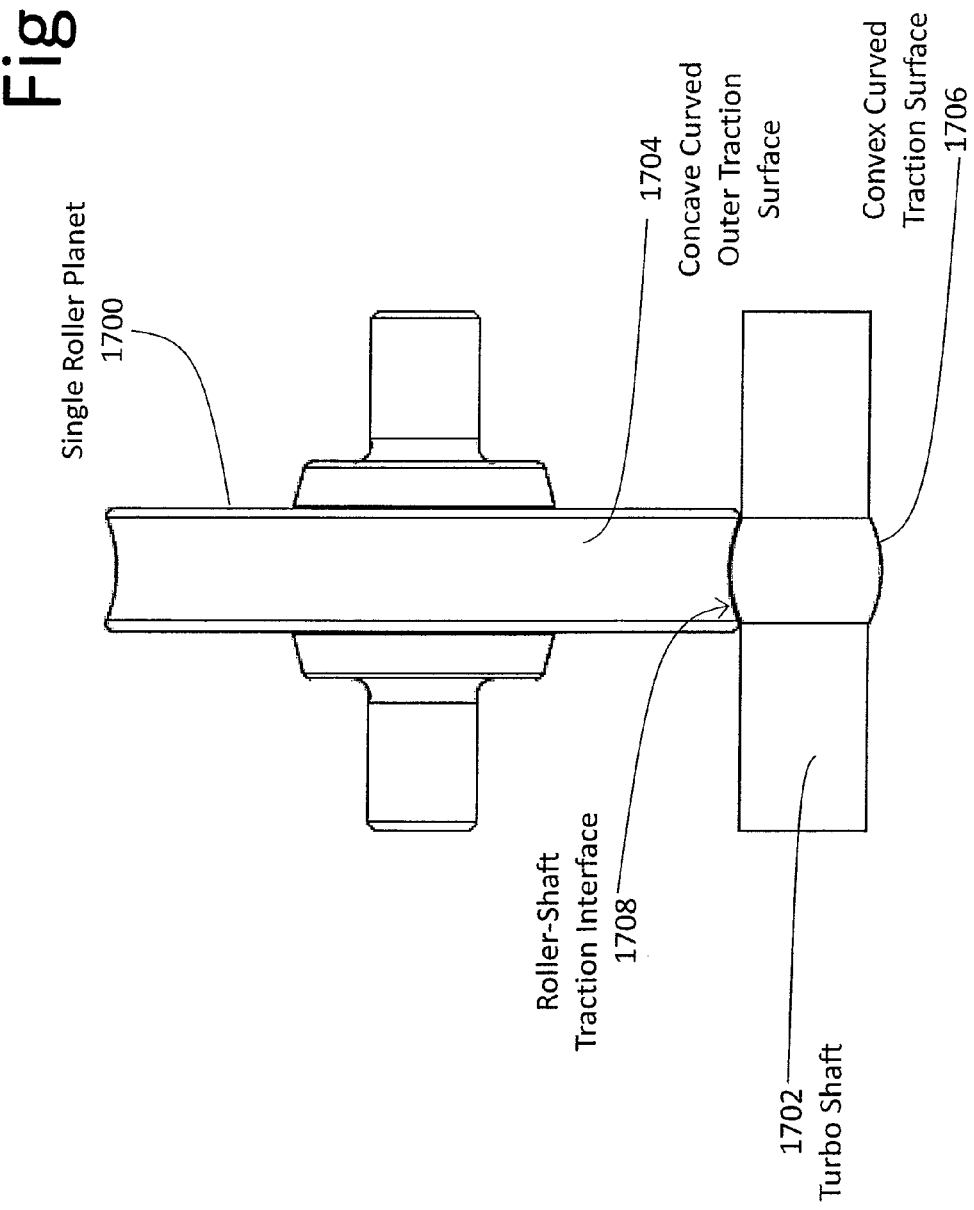

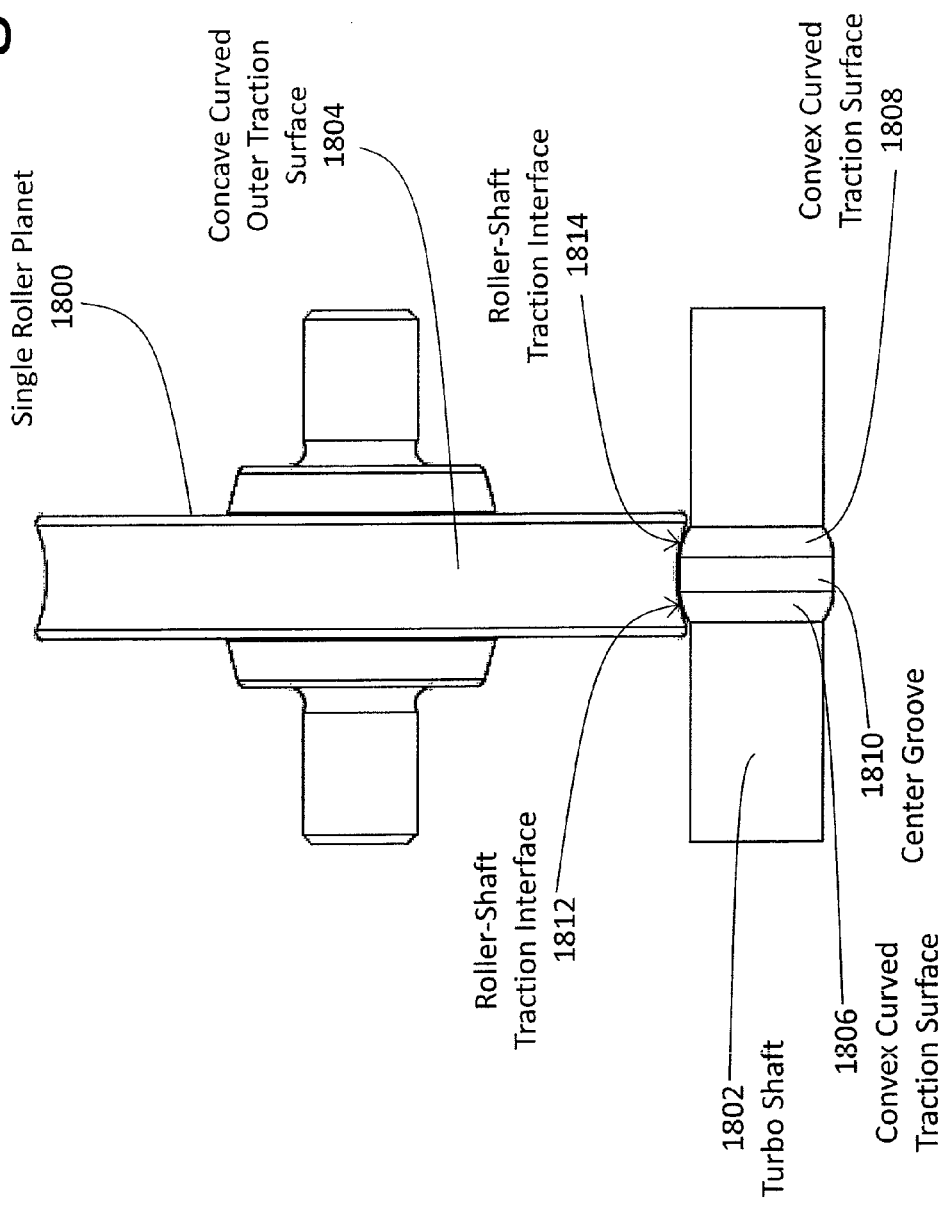

THRUST ABSORBING PLANETARY TRACTION DRIVE SUPERTURBO

CROSS-REFERENCE TO RELATED APPLICATION

The present application is based upon and claims the benefit of Provisional Patent Application No. 61/906,938, entitled "Thrust Absorbing Planetary Traction Drive Superturbo," and filed Nov. 21, 2013, by Ryan Sherrill, Sterline Holman and Jared William Brown. The entire content of the above-mentioned application is hereby specifically incorporated herein by reference for all it discloses and teaches.

BACKGROUND

Both turbochargers and superchargers are capable of enhancing the performance of an engine. Super-turbochargers are even more effective at enhancing the performance of engines. Super-turbochargers both utilize turbo compounding and eliminate turbo lag and have the advantages of both turbochargers and superchargers.

SUMMARY

An embodiment of the invention may therefore comprise a planetary traction drive for a super-turbocharger that is both mechanically driven by an engine system and driven by exhaust gases from the engine system comprising: a turbo shaft; a turbine connected to one end of the turbo shaft; a compressor connected to an opposite end of the turbo shaft; a first slanted traction surface formed on the turbo shaft, the first slanted traction surface slanted at a first angle in a first direction; a second slanted traction surface formed on the turbo shaft, the second slanted traction surface slanted at a second angle, the second angle being substantially equal to and in an opposite direction of the first angle; at least one double roller planet having a first roller and a second roller, the first roller having a first roller outer traction surface that engages the first slanted traction surface of the turbo shaft to form a first roller-shaft traction interface, the second roller having a second roller outer traction surface that engages the second slanted traction surface of the turbo shaft to form a second roller-shaft traction interface between the second roller and the turbo shaft, the first roller-shaft traction interface and the second roller-shaft traction interface locating the turbo shaft axially and creating axial forces on the turbo shaft that counteract thrust forces generated in an axial direction on the turbo shaft.

An embodiment of the invention may further comprise a method of transferring rotational mechanical energy in a super-turbocharger having a traction drive comprising: driving the super-turbocharger mechanically with an engine and with exhaust gases from the engine; forming slanted traction surfaces on a turbo shaft that have substantially equal but opposite slant angles, which locate the turbo shaft axially and create axial forces on the turbo shaft that counteract thrust forces generated in an axial direction on the turbo shaft.

An embodiment of the invention may further comprise a planetary traction drive for a super-turbocharger that is both mechanically driven by an engine and by exhaust gases from the engine comprising: a turbo shaft; a turbine connected to a first end of the turbo shaft; a compressor connected to a second end of the turbo shaft; a first slanted traction surface formed on the turbo shaft, the first slanted surface slanted at a first angle; a second slanted traction surface formed on the turbo shaft, the second slanted traction surface slanted at a second angle, the second angle being substantially equal to, and opposite of, the first angle; a single roller planet having an outer roller traction surface that has a first portion that is slanted at the first angle in a first direction and a second portion that is slanted at the second angle in a second direction, the single roller planet disposed so that the first portion of the outer roller traction surface that is slanted in the first direction engages the first slanted traction surface of the turbo shaft to create a first roller-shaft traction interface that generates an axial force on the turbo shaft in the first direction, and the second portion of the outer roller traction surface that is slanted in the second direction engages the second slanted traction surface of the turbo shaft to create an axial force on the turbo shaft in the second direction that counteract axial forces on the turbo shaft and locates the turbo shaft axially.

An embodiment of the invention may further comprise a method of transferring rotational mechanical energy in a super-turbocharger having a traction drive comprising: driving the super-turbocharger mechanically with an engine and with exhaust gases from the engine; forming two slanted traction surfaces on the turbo shaft that have substantially equal but opposite slant angles; forming roller-shaft traction interfaces by mating the slanted traction surfaces on the turbo shaft with two slanted outer traction surfaces on a single roller planet, which creates axial forces on the turbo shaft that counteract thrust forces generated in an axial direction on the turbo shaft.

An embodiment of the invention may further comprise a planetary traction drive for a super-turbocharger that is driven by both exhaust gases from an engine and rotational mechanical energy generated by the engine comprising: a turbo shaft; a turbine connected to a first end of the turbo shaft; a compressor connected to a second end of the turbo shaft; a curved traction surface on the turbo shaft; a planet roller with an outer curved traction surface that mates with the curved traction surface on the turbo shaft to form a roller-shaft curved traction interface that transmits torque between the planet and the turbo shaft, and locates the turbo shaft axially by producing axial forces that counteract thrust forces on the turbo shaft.

An embodiment of the invention may further comprise a planetary traction drive for a super-turbocharger that is both mechanically driven by an engine system and driven by exhaust gases from the engine system comprising: a turbo shaft; a turbine connected to one end of the turbo shaft; a compressor connected to an opposite end of the turbo shaft; a first slanted traction surface formed on the turbo shaft, the first slanted traction surface slanted at a first angle in a first direction; a second slanted traction surface formed on the turbo shaft, the second slanted traction surface slanted at a second angle, the second angle being substantially equal to and in an opposite direction of the first angle; double roller planet means having a first roller and a second roller, the first roller having a first roller outer traction surface that engages the first slanted traction surface of the turbo shaft for forming a first roller-shaft traction interface, the second roller having a second roller outer traction surface that engages the second slanted traction surface of the turbo shaft for forming a second roller-shaft traction interface between the second roller and the turbo shaft, the first roller-shaft traction interface and the second roller-shaft traction interface locating the turbo shaft axially and creating axial forces on the turbo shaft that counteract thrust forces generated in an axial direction on the turbo shaft.

An embodiment of the invention may further comprise a super-turbocharger having a traction drive for transferring rotational mechanical energy comprising: engine means for driving the super-turbocharger mechanically; turbo means for driving the super-turbocharger with exhaust gases from the engine; slanted traction surface means on a turbo shaft for locating the turbo shaft axially and creating axial forces on the turbo shaft that counteract thrust forces generated in an axial direction on the turbo shaft.

An embodiment of the invention may further comprise a planetary traction drive for a super-turbocharger that is driven by both exhaust gases from an engine and rotational mechanical energy generated by the engine comprising: a turbine; a compressor; a turbo shaft for connecting the turbine and the compressor; a curved traction surface on the turbo shaft; planet roller means with an outer curved traction surface that mates with the curved traction surface on the turbo shaft for forming a roller-shaft curved traction interface that transmits torque between the planet roller means for producing axial forces on the turbo shaft that counteract thrust forces on the turbo shaft for preventing the turbo shaft from moving axially.

An embodiment of the invention may further comprise a driven turbocharger comprising a compressor; a turbine; turbo shaft means for connecting the compressor and the turbo shaft; mechanical speed step-down means connected to the turbo shaft for decreasing rotational speed of the turbo shaft at an output, which locates the turbo shaft axially and provides reaction forces to counteract thrust forces on the turbo shaft to prevent axial movement of the turbo shaft.

BRIEF DESCRIPTION OF THE DRAWINGS

FIG. 17 is a side view of a single roller planet and turbo shaft that can be utilized in the embodiment of FIG. 13.

FIG. 18 is a side view of a single roller planet and turbo shaft that can be utilized in the embodiment of FIG. 13.

DETAILED DESCRIPTION OF THE EMBODIMENTS

Figure 1:
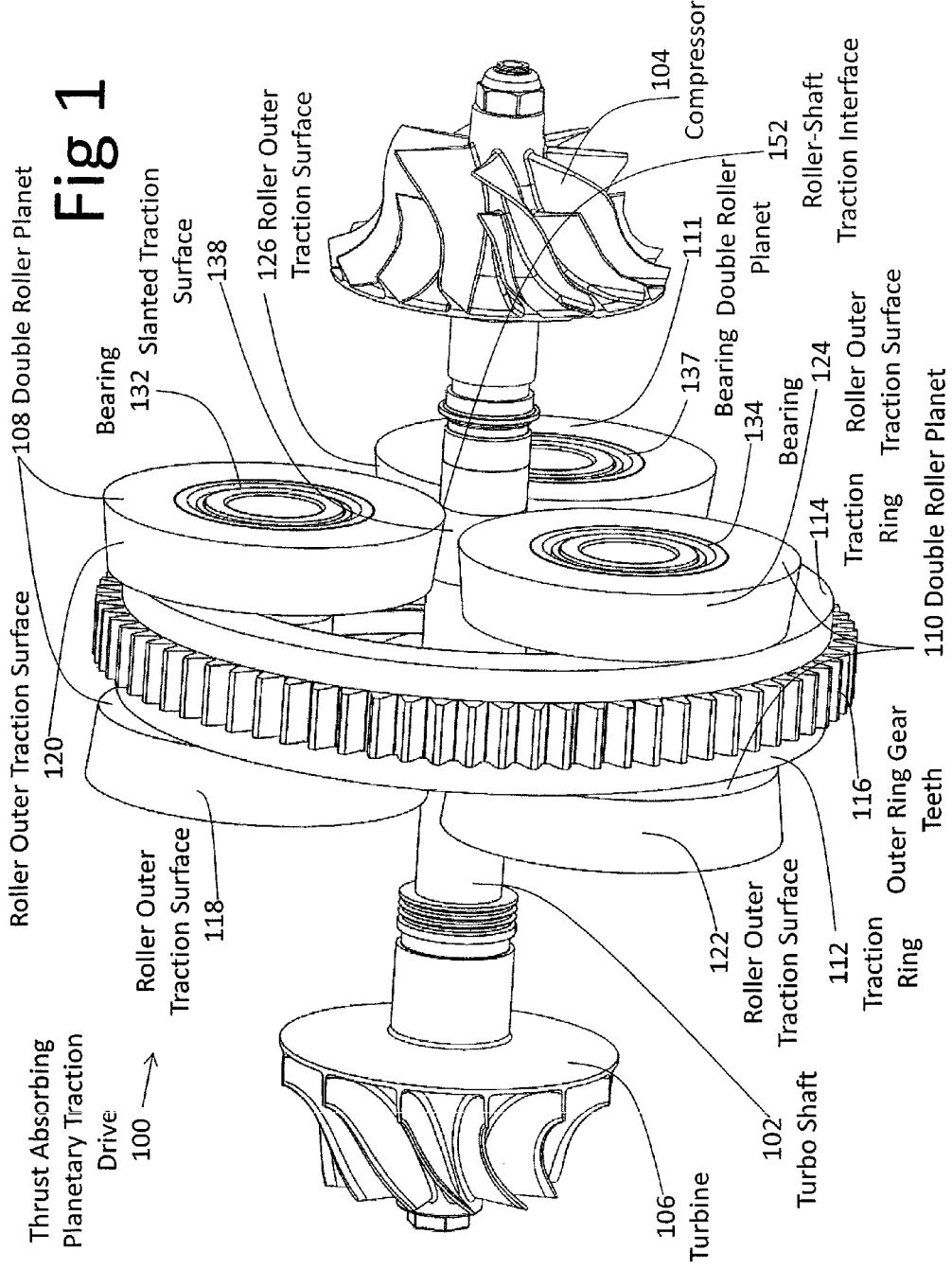
FIG. 1 is a schematic isometric view of an embodiment of a thrust absorbing planetary traction drive.

FIG. 1 is a schematic isometric view of an embodiment of a thrust absorbing planetary traction drive 100 that is used in a super-turbocharger. A super-turbocharger is a device that is both mechanically driven by an engine system and also driven by exhaust gases from the engine system. One of the primary advantages of a super-turbocharger is that turbo lag is eliminated. Super-turbochargers are disclosed in more detail in U.S. Pat. No. 8,561,403, issued Oct. 22, 2013, entitled "Super-Turbocharger Having a High Speed Traction Drive and a Continuously Variable Transmission," and in U.S. patent application Ser. No. 13/012,778, filed Jan. 24, 2011, by Ed VanDyne, Volker Schumacher, Jared William Brown and Tom Waldron, entitled "Rich Fuel Mixture Super-Turbocharged Engine System," and U.S. patent application Ser. No. 13/108,831, filed May 16, 2011, by Ed VanDyne and Jared William Brown, entitled "Rich Fuel Mixture Super-Turbocharged Engine System," which are specifically incorporated herein by reference for all that they disclose and teach. Also incorporated herein for all they disclose and teach are U.S. Pat. No. 8,608,609, issued Dec. 17, 2013, entitled "Symmetrical Traction Drive," and U.S. Pat. No. 8,668,614, issued Mar. 11, 2014, entitled "High Torque Traction Drive.

Figure 2:
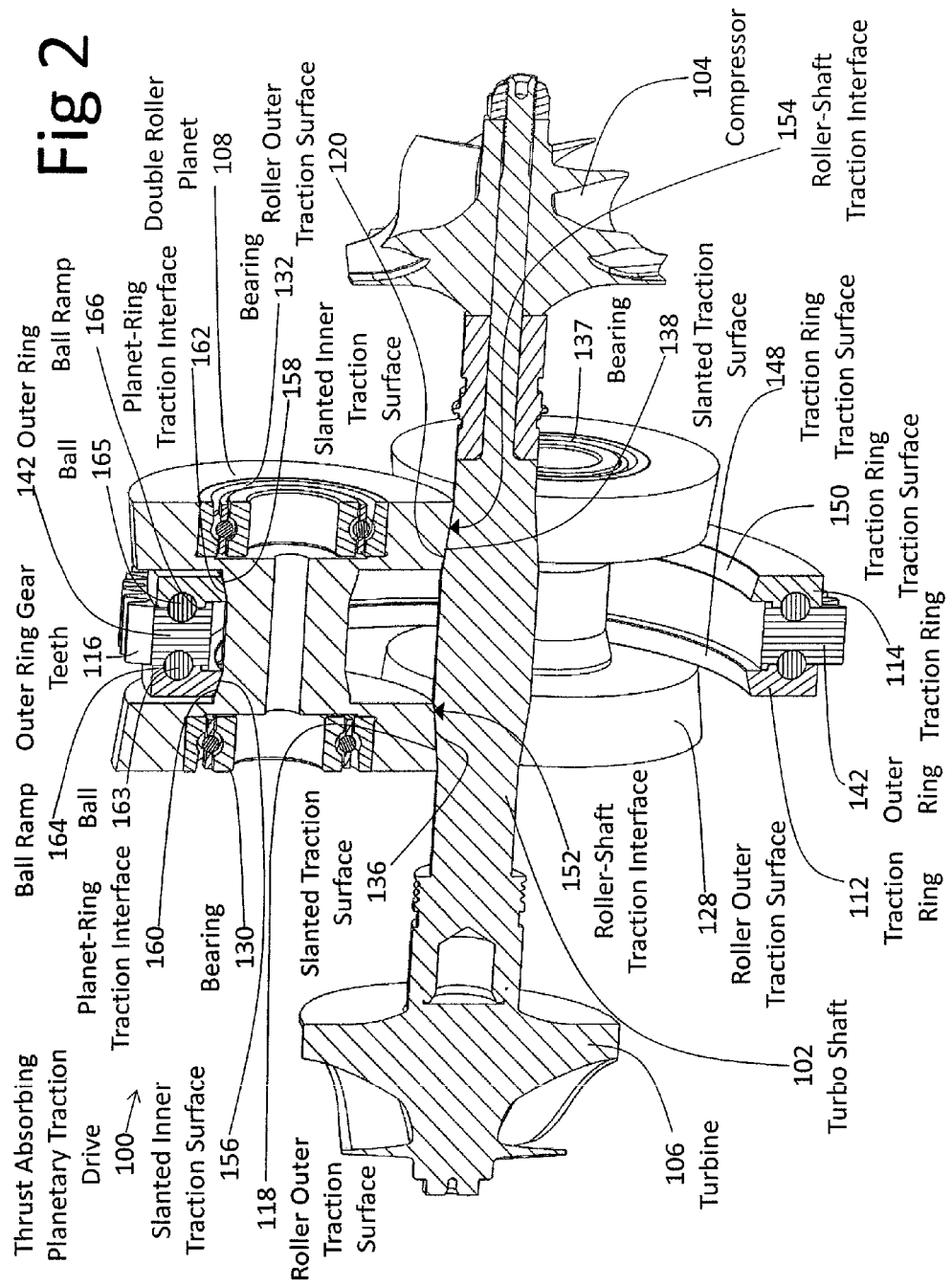
FIG. 2 is a schematic cross-sectional view of the embodiment of FIG. 1.

Also, as shown in FIG. 1, the thrust absorbing planetary traction drive 100 includes a turbo shaft 102 that is connected to a compressor 104 and a turbine 106. The thrust absorbing planetary drive 100 includes three sets of double roller planets, including double roller planet 108, double roller planet 110 and double roller planet 111. Double roller planet 108 has two rollers that have sloped roller outer traction surfaces 118, 120. Similarly, double roller planet 110 has two rollers having sloped roller outer traction surfaces 122, 124. Double roller planet 111 has sloped outer roller traction surfaces 126, 128 (FIG. 2). The sloped roller outer traction surfaces 120, 124 and 126 interface with the slanted traction surface 138 of the turbo shaft 102. Roller outer traction surfaces 118, 122, 128 interface with the slanted traction surface 136 of the turbo shaft 102, as more clearly illustrated in FIG. 2. Double roller planet 108 is supported by bearings 130, 132 (FIG. 2). Double roller planet 111 is supported by bearing 137 and another bearing that is not shown. Double roller planet 110 is supported by bearing 134 and another bearing that is not shown. The thrust absorbing planetary traction drive 100 also includes traction rings 112, 114 that surround an outer ring 142 (FIG. 2) having outer ring gear teeth 116.

FIG. 2 is a cross-sectional view of the embodiment of the thrust absorbing planetary traction drive 100 of FIG. 1. As illustrated in FIG. 2, the turbo shaft 102 has a slanted traction surface 136 that mates with roller outer traction surface 118, which creates a roller-shaft traction interface 152. Similarly, turbo shaft 102 has a slanted traction surface 138 that creates a traction interface with roller outer traction surface 120 to create the roller-shaft traction interface 154. Since the roller-shaft traction interface 154 and roller-shaft traction interface 152 are slanted in opposite directions toward each other, the turbo shaft 102 is held in place in response to thrust created on the turbo shaft 102 in an axial direction along the length of the turbo shaft 102. In other words, forces on the turbo shaft 102 in the direction of the axis of the turbo shaft 102 are counteracted by the roller-shaft traction interfaces 152, 154, which hold the turbo shaft 102 in place in the thrust absorbing planetary traction drive 100. Compressor 104 and turbine 106 may create a thrust force on the turbo shaft 102 along the direction of the axis of the turbo shaft 102. Both of the roller-shaft traction interfaces 152, 154 are slanted toward the center of the turbo shaft 102, which generates an inward force toward the center of the turbo shaft 102 from each of the roller-shaft traction interfaces 152, 154, which functions to center the turbo shaft 102 with the double roller planets 108, 110, 111. Other designs have required a thrust bearing on the turbo shaft 102 to prevent movement in a lateral or axial direction along the axis of the turbo shaft 102, so as to hold the turbo shaft 102 in place and centered in the thrust absorbing planetary drive 100. The use of the slanted traction surfaces 136, 138 on the turbo shaft 102 eliminates the need for a thrust bearing on the turbo shaft 102 to hold the turbo shaft from moving in an axial direction.

As also illustrated in FIG. 2, the double roller planet 108 is constructed from a single structure and is supported by bearings 130, 132. The double roller planets, such as double roller planet 108, can be constructed as one solid piece, or in two or three pieces that may be bolted together. The double roller planets are held in a planetary carrier (not shown) by bearings 132, 134, 137 and similar bearings, such as bearing 130, on the opposite side of the double roller planets, that allow the double roller planets to rotate, but does not allow the double roller planets to move in an axial direction, which in turn holds the turbo shaft 101 in a fixed axial location. The planetary carriers may also be flexible, in the manner disclosed in U.S. patent application Ser. No. 13/336,346, filed Dec. 23, 2011, by Ryan Sherrill, Sterling Holman, Ed VanDyne and Wayne Penfold, entitled "Symmetrical Traction Drive," which is specifically incorporated herein by reference for all that it discloses and teaches. The flexible carrier allows the double roller planets to move radially, i.e., inwardly and outwardly with respect to the turbo shaft 102, so that the traction on the roller-shaft traction interfaces 152, 154 varies. Traction rings 112, 114 include sloped ring traction surfaces 148, 150. The ring traction surface 148 forms a planet-ring traction interface 160 with the slanted inner traction surface 156 formed in an axial portion of the double roller planet 108. The ring traction surface 148 is a sloped surface, which creates a sloped planet-ring traction interface 160. In a similar manner, the ring traction surface 150 is sloped, which engages slanted inner traction surface 158 on the axial portion of the double roller planet 108 to form a sloped planet-ring traction interface 162. Ball 163 sits within ball ramps 164, while ball 165 sits within ball ramp 166. Ball ramps 164, 166 are formed in the outer ring 142 and traction rings 112, 114, respectively. As torque is applied to the outer gear ring teeth 116, or to the double roller planet 108 via turbo shaft 102, the balls 163, 165 move in the ball ramps 164, 166 and generate an outward force on the traction rings 112, 114. This occurs automatically when torque is applied to the outer ring gear teeth 116 or through the turbo shaft 102. The force which is created is in a lateral direction, which is substantially parallel to the axis of the turbo shaft 102 and parallel to the axis of rotation of the double planet roller 108, forces the traction rings 112, 114 outwardly in an axial direction, so that the ring traction surfaces 148, 150 are pushed in a radially outward direction on the slanted inner traction surfaces 156, 158 of the double roller planet 108 to generate a normal force on the planet-ring traction interfaces 160, 162. These planet-ring traction interfaces 160, 162 have substantially the same slope in opposite directions, so that the outer ring 142 remains substantially centered with the double roller planet 108. As the torque increases, the forces in the outward lateral direction between the outer ring 142 and the traction rings 112, 114 increases, which increases the normal forces on the planet-ring traction interfaces 160, 162, so that more torque can be transferred between the traction rings 112, 114 and the double roller planet 108. In this manner, torque on either the turbo shaft 102, or the outer ring gear teeth 116, cause the traction rings 112, 114 to automatically engage the roller slanted inner traction surfaces 156, 158 in an amount that is related to the amount of torque. Since the slanted inner traction surfaces 156, 158 have a component in the radial direction toward the turbo shaft 102, increasing the force on these surfaces also increases the normal forces on roller-shaft traction interfaces 152, 154 to increase the torque transfer through these interfaces as well.

Figure 3:
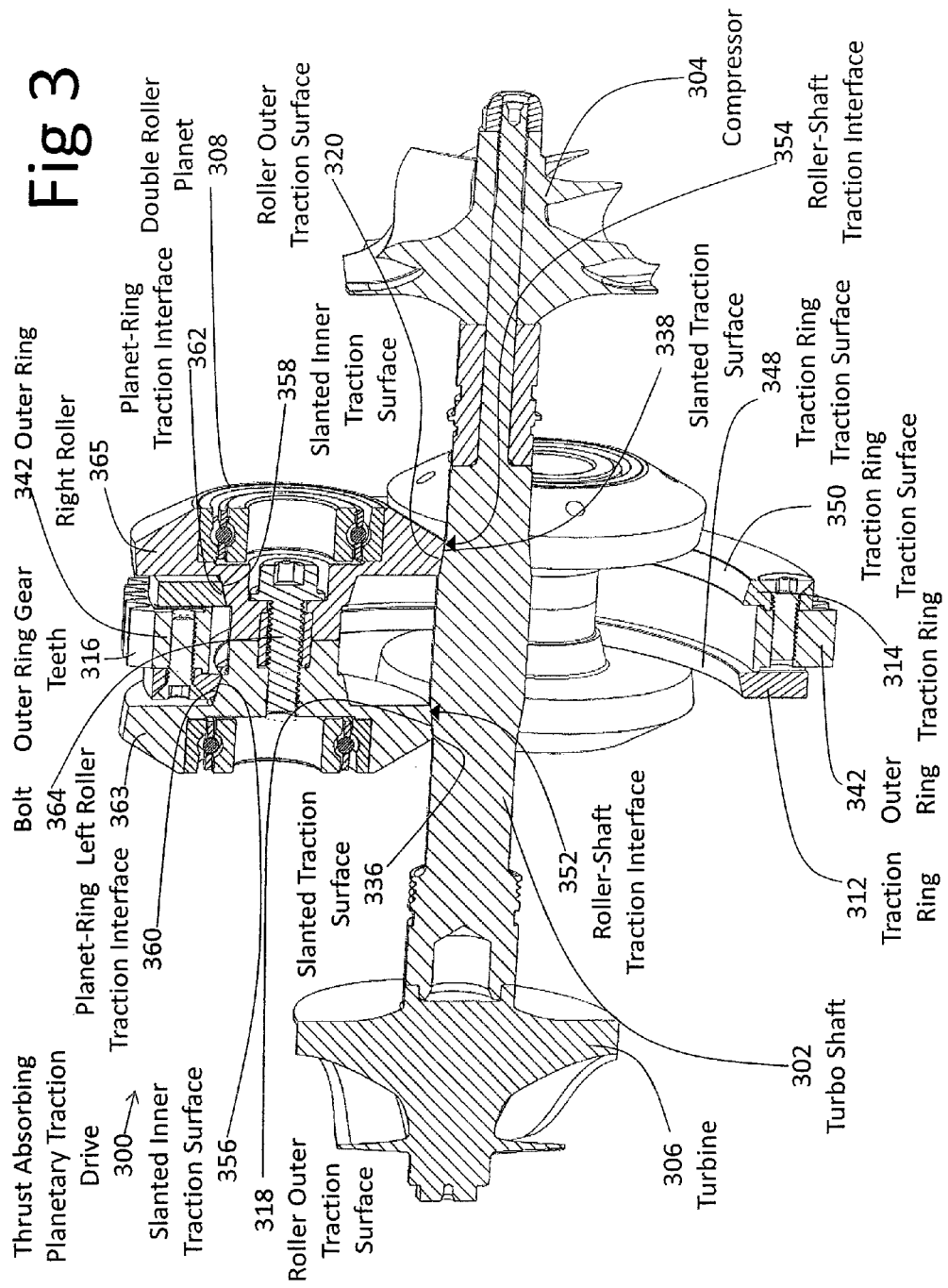
FIG. 3 is a schematic cross-sectional view of a double roller planet thrust absorbing planetary traction drive with fixed loading.

FIG. 3 is a cross-sectional view of a double roller thrust absorbing planetary traction drive 300 with fixed loading. As illustrated in FIG. 3, the basic concept of FIG. 2 is retained in respect to the traction surfaces, only the method of loading the traction surfaces is different. Turbo shaft 302 has slanted traction surfaces 336, 338 formed on it that mate with outer roller traction surfaces 318, 320 of double roller planet 308 to form roller-shaft traction interfaces 352, 354. These roller-shaft traction interfaces 352, 354 transmit torque between double roller planet 308 and turbo shaft 302, as well as locate turbo shaft 302 axially and absorb thrust forces from turbine 306 and compressor 304. Double roller planet 308 also has slanted inner traction surfaces 356, 358 that mate with traction ring traction surfaces 348, 350 to form planet-ring traction interfaces 360, 362. These planet-ring traction interfaces 360, 362 transmit torque between double roller planet 308 and traction rings 312, 314. Traction rings 312, 314 are in turn rigidly connected to or formed on outer ring 342, which has outer ring gear teeth 316 that connect the thrust absorbing planetary traction drive 300 to the engine system (not shown). At least one double roller planet 308 is composed of two pieces, left roller 363 and right roller 365. Bolt 364 connects left roller 363 and right roller 365, and during assembly is tightened to a certain level. As bolt 364 is tightened, left roller 363 and right roller 365 are forced toward each other, which produces increasing normal forces on planet-ring traction interfaces 360, 362, and in turn forces double roller planet 308 toward turbo shaft 302, increasing normal forces in roller-shaft traction interfaces 352, 354. Thus, tightening bolt 364 to a certain level results in a designed normal force through all traction interfaces 352, 354, 360, 362 to allow these traction interfaces 352, 354, 360, 362 to transmit torque through thrust absorbing planetary traction drive 300.

Figure 4:
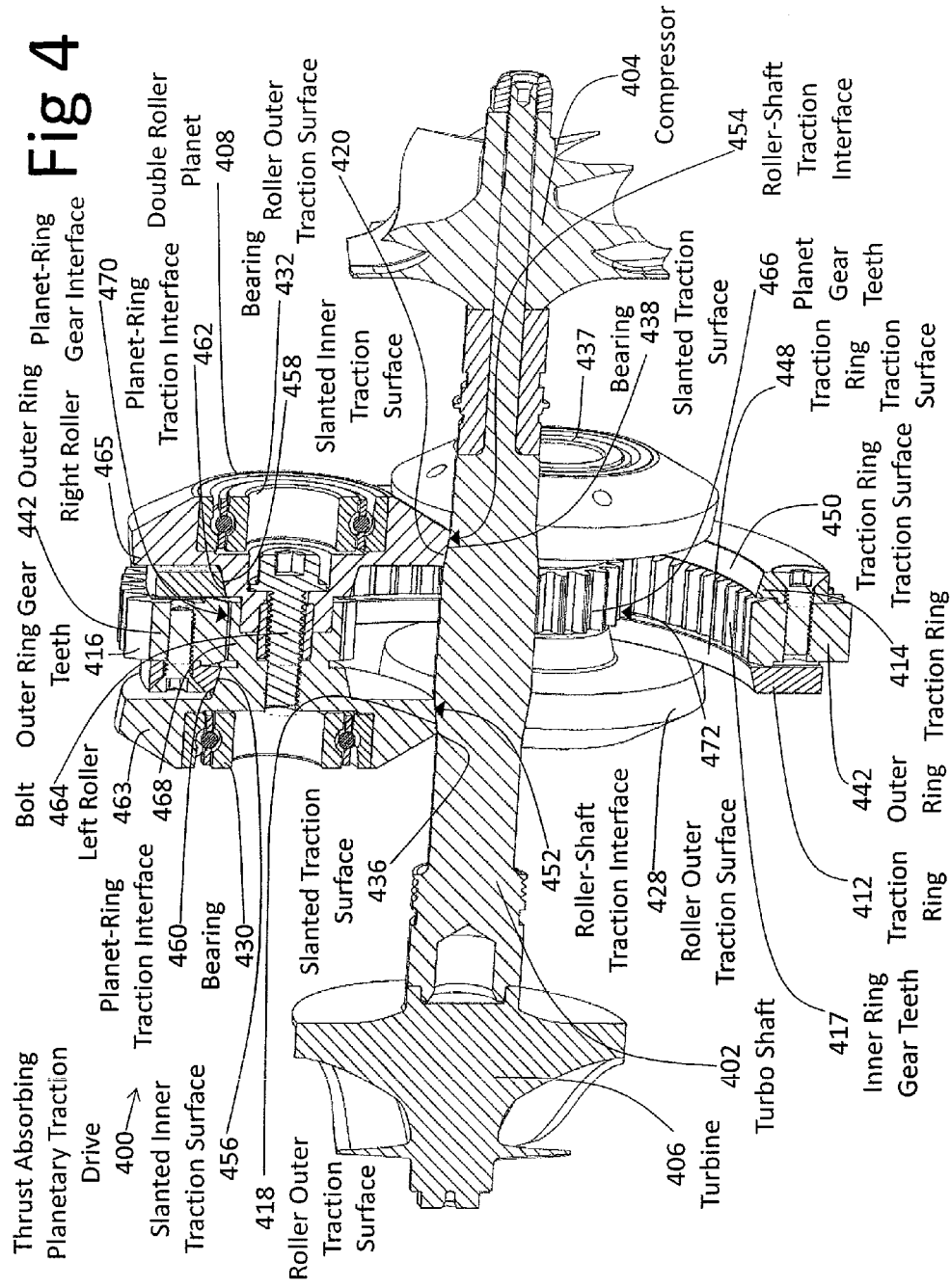
FIG. 4 is a schematic cross-sectional view of the embodiment of FIG. 3 with the addition of a gear interface between the planets and the ring.

FIG. 4 is a cross-sectional view of the embodiment of FIG. 3 with the addition of a planet-ring gear interface 470 between the double roller planets 408 and outer ring 442. Double roller planets 408 each have planet gear teeth 466, 468 between slanted inner traction surfaces 456, 458. Outer ring 442 has corresponding inner ring gear teeth 417 that mate with planet gear teeth 466, 468 to form planet-ring gear interfaces 470, 472. The addition of planet-ring gear interfaces 470, 472 allows large amounts of torque to be transmitted between double roller planets 408 and outer ring 442 for high-torque applications. Planet-ring traction interfaces 460, 462 no longer transmit torque, but are used to generate forces as bolt 464 is tightened that push double roller planets 408 toward turbo shaft 402 to provide normal forces in roller-shaft traction interfaces 452, 454 so that torque can be transmitted between turbo shaft 402 and double roller planets 408. To minimize slip in planet-ring traction interfaces 460, 462, the center of contact between double roller planet 408 and outer ring 442 through both planet-ring traction interfaces 460, 462 and planet-ring gear interface 470 are designed to be at the same radial position to minimize speed differences between the interfaces 460, 462, and 470.

Figure 5:
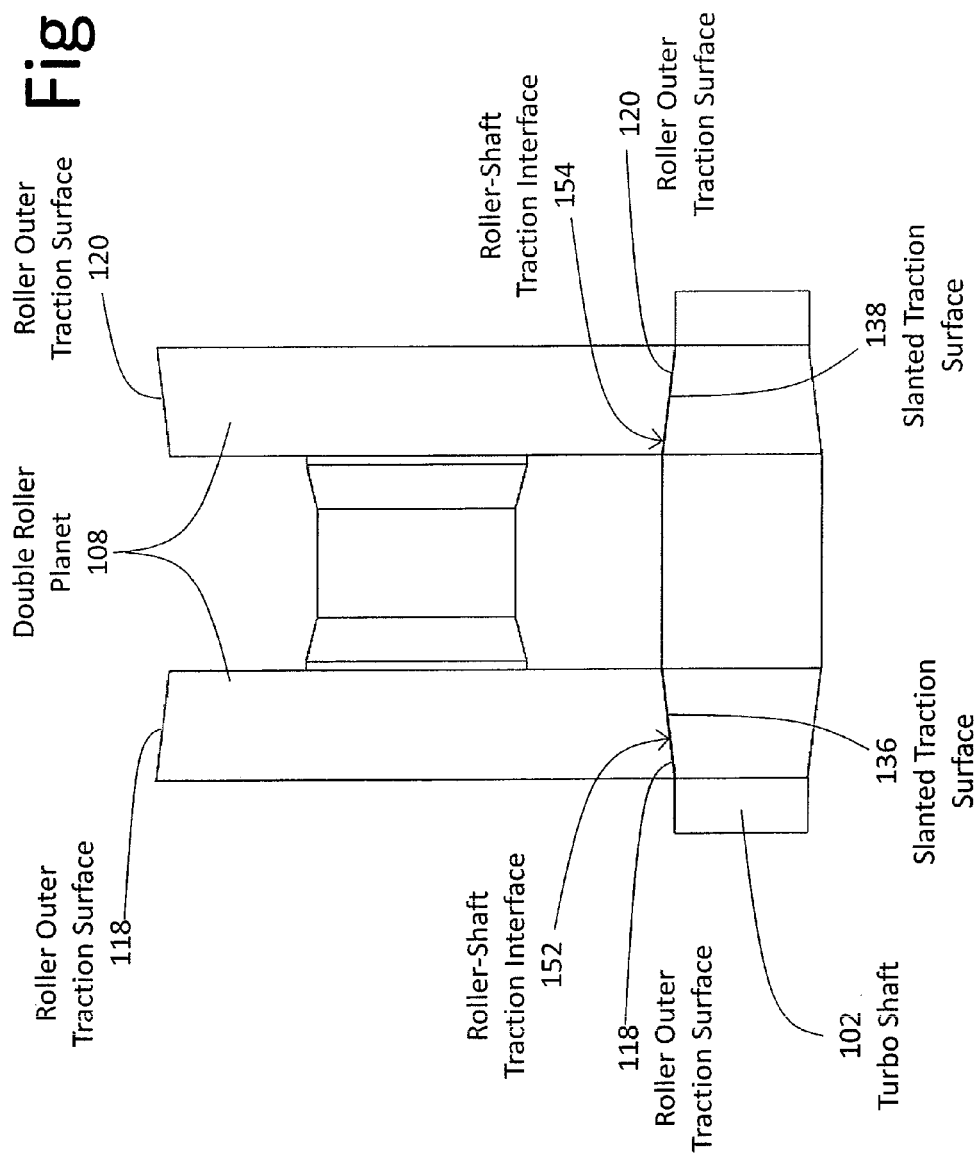
FIG. 5 is a schematic side view illustrating a double roller planet and a turbo shaft that can be utilized in the embodiment of FIG. 1.

FIG. 5 is a schematic side view of the double roller planet 108 and turbo shaft 102 of the embodiment of FIG. 1. As illustrated in FIG. 5, the double roller planet has roller outer traction surfaces 118, 120 that are slanted. The slant on the roller outer traction surfaces 118, 120 may be on the order of several degrees from the lateral plane. The slanted roller outer traction surfaces 118, 120 engage the slanted traction surfaces 136, 138 that have substantially the opposite slant, so that roller-shaft traction interfaces 152, 154 are created, which are smooth and extend along substantially the entire contact surface between the roller outer traction surfaces 118, 120 and the slanted traction surfaces 136, 138. In this manner, the roller-shaft traction interfaces 152, 154 are substantially straight and have substantially equal and opposite inclinations. In this manner, thrust or forces along the axis of the turbo shaft 102 cause the turbo shaft 102 to be held in place.

Figure 6:
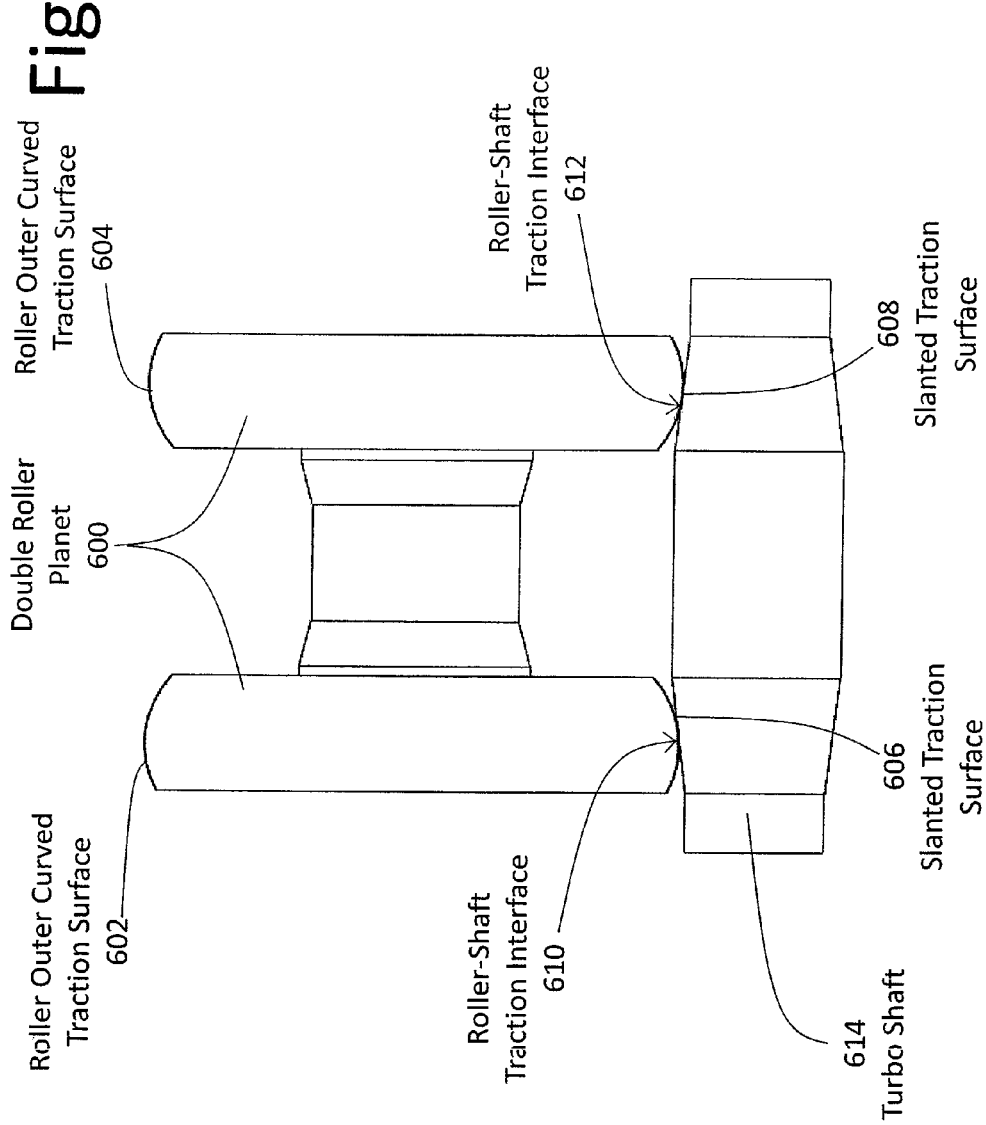
FIG. 6 is a schematic side view of an embodiment of a double roller planet and turbo shaft that can be utilized in the embodiment of FIG. 1.

FIG. 6 is a side view of another embodiment of a double roller planet 600 and turbo shaft 614. As illustrated in FIG. 6, double roller planet 600 has curved outer traction surfaces that are tilted slightly in an inward direction which is the same as the tilt of the slanted traction surfaces 606, 608. This creates a roller-shaft traction interface 610, 612 that centers the turbo shaft 614 between the double roller planet 600. The roller outer curved traction surfaces 602, 604 allow for slight misalignments between the turbo shaft 614 and the double roller planet 600.

Figure 7:
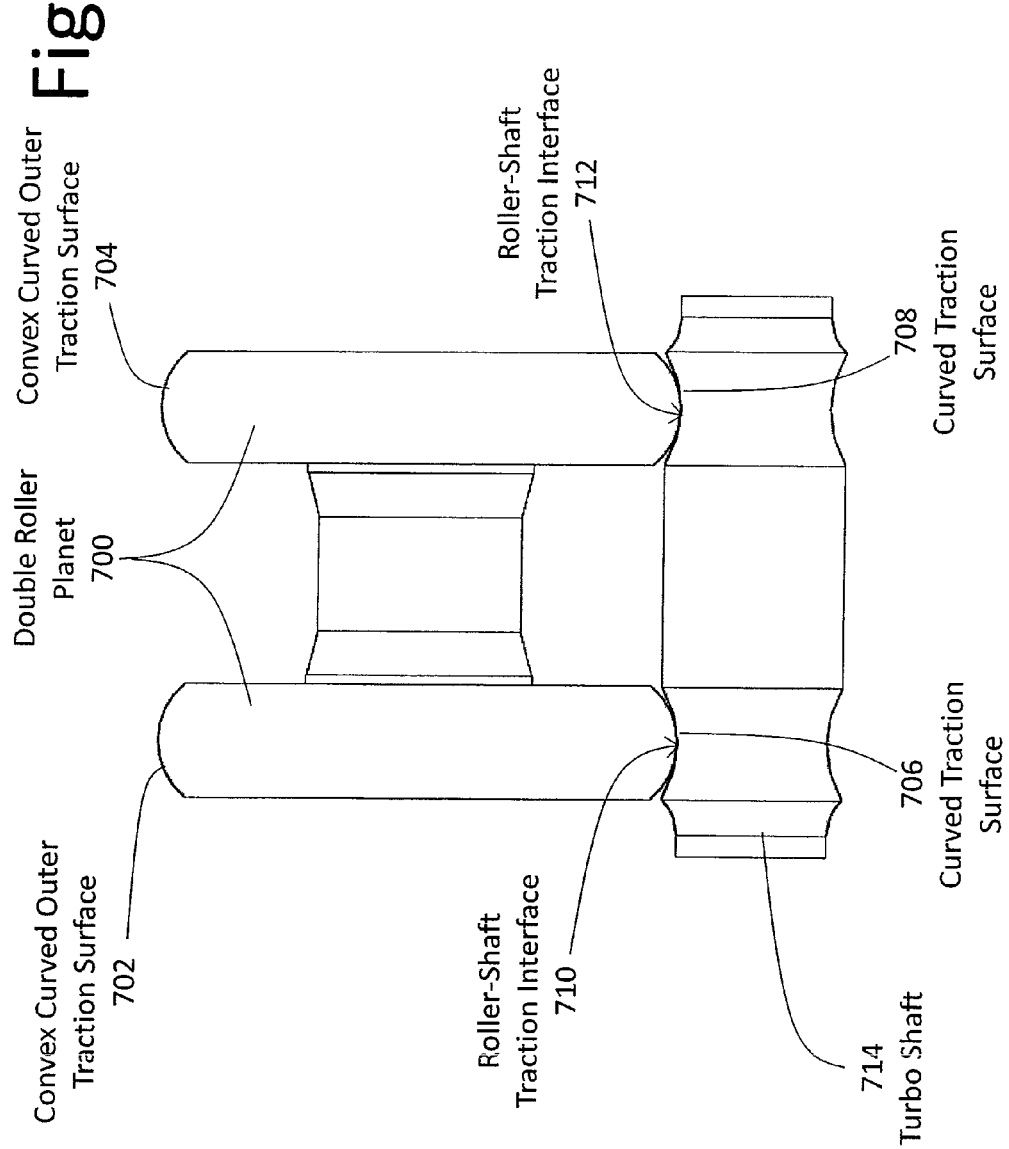
FIG. 7 is a schematic illustration of a double roller planet and turbo shaft that can be utilized in the embodiment of FIG. 1.

FIG. 7 is a schematic side view of another embodiment of a double roller planet 700 and turbo shaft 714. As illustrated in FIG. 7, the double roller planet 700 has convex curved outer traction surfaces 702, 704. Turbo shaft 714 has curved traction surfaces 706, 708 that have a curve that is concave and substantially matches the curve of the convex curved outer traction surfaces 702, 704. The intersection of the curved traction surfaces 706, 708 with the convex curved outer traction surfaces 702, 704 creates roller-shaft traction interfaces 710, 712, respectively. The curvature of the convex curved outer traction surfaces 702, 704 and the curved traction surfaces 706, 708 prevents axial movement of the turbo shaft 714 and also allows for slight misalignment between the turbo shaft 714 and the double roller planets 700 without significantly changing the geometry of the contact areas of the roller-shaft traction interfaces 710, 712.

Figure 8:
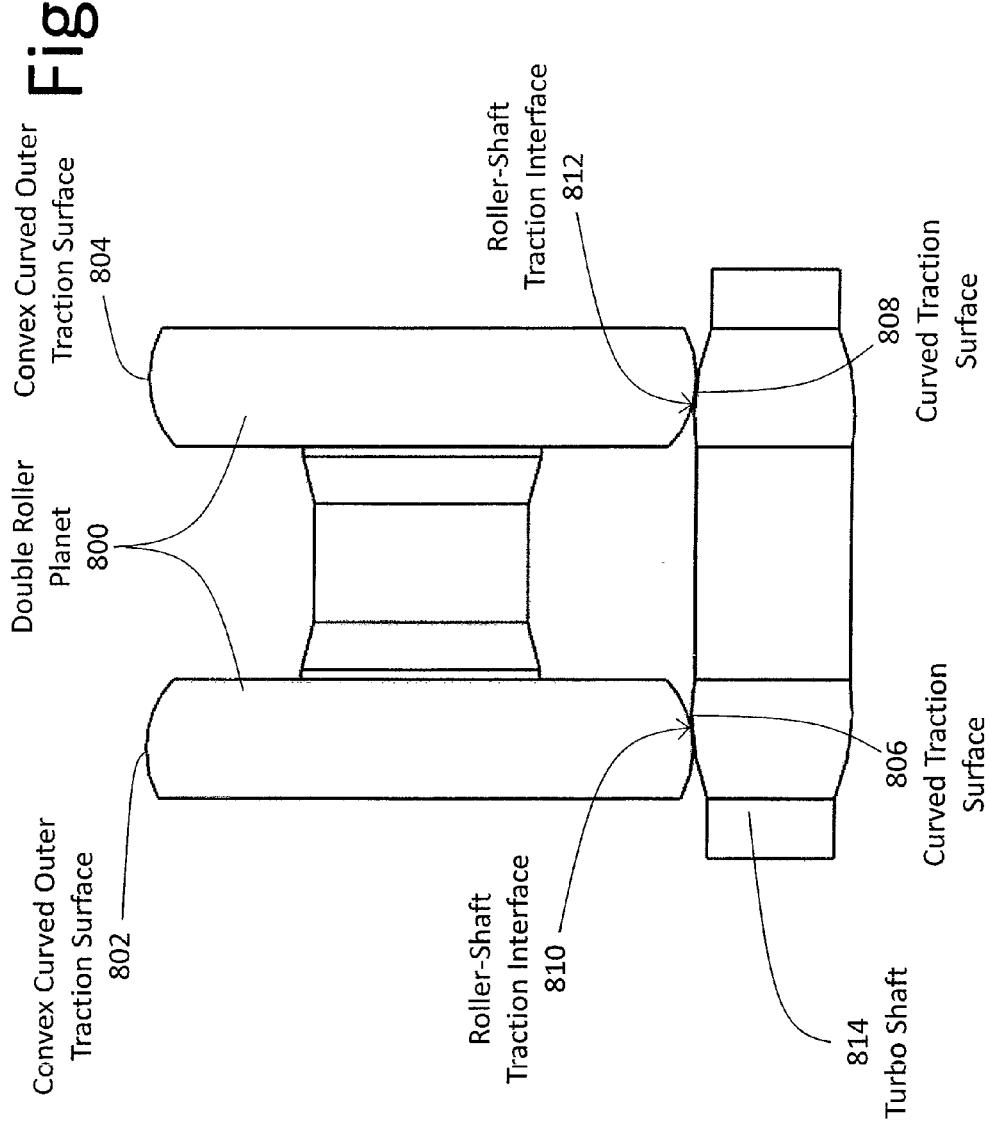
FIG. 8 is a schematic side view of a double roller planet and traction drive that can be utilized in accordance with the embodiment of FIG. 1.

FIG. 8 is a schematic side view of another embodiment of a double roller planet 800 and a turbo shaft 814. As illustrated in FIG. 8, the double roller planet 800 has convex curved outer traction surfaces 802, 804 that are slanted inwardly toward the center of the double roller planet 800. Turbo shaft 814 has curved traction surfaces 806, 808 that are slanted in the opposite direction, i.e., in a lateral (radial) direction away from the center of the turbo shaft 814. The intersection of the curved traction surfaces 806, 808 with the convex curved outer traction surfaces 802, 804 of the double roller planet 800 creates roller-shaft traction interfaces 810, 812, respectively. The roller-shaft traction interfaces 810, 812 create lateral forces on the turbo shaft 814, which center the turbo shaft 814 with the double roller planet 800. The curvature of the traction surfaces on both the turbo shaft 814 and the double roller planet 800, allows for slight misalignment between the turbo shaft 814 and the double roller planet 800 without significantly changing the geometry of the contact area of the roller-shaft traction interfaces 810, 812.

Figure 9:
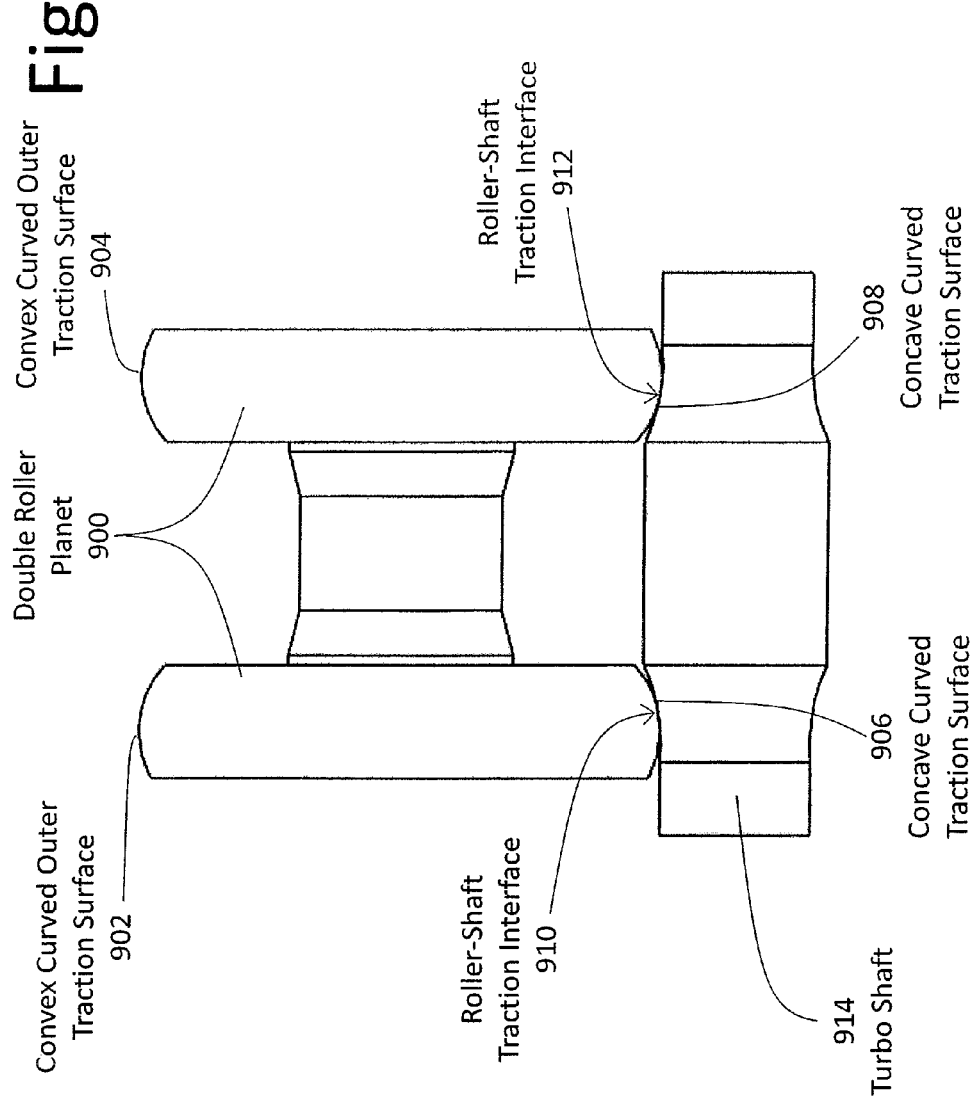
FIG. 9 is a schematic side view of a double roller planet and traction drive that can be utilized in accordance with the embodiment of FIG. 1.

FIG. 9 is a schematic side view of another embodiment of a double roller planet 900 and turbo shaft 914. As illustrated in FIG. 9, the double roller planet 900 has convex curved outer traction surfaces 902, 904. Turbo shaft 914 has concave curved traction surfaces 906, 908. The intersection of the convex curved outer traction surfaces 902, 904 with the concave curved traction surfaces 906, 908 creates roller-shaft traction interfaces 910, 912. Roller-shaft traction interfaces 910, 912 counteract thrust along the axis of the turbo shaft 914.

Figure 10:
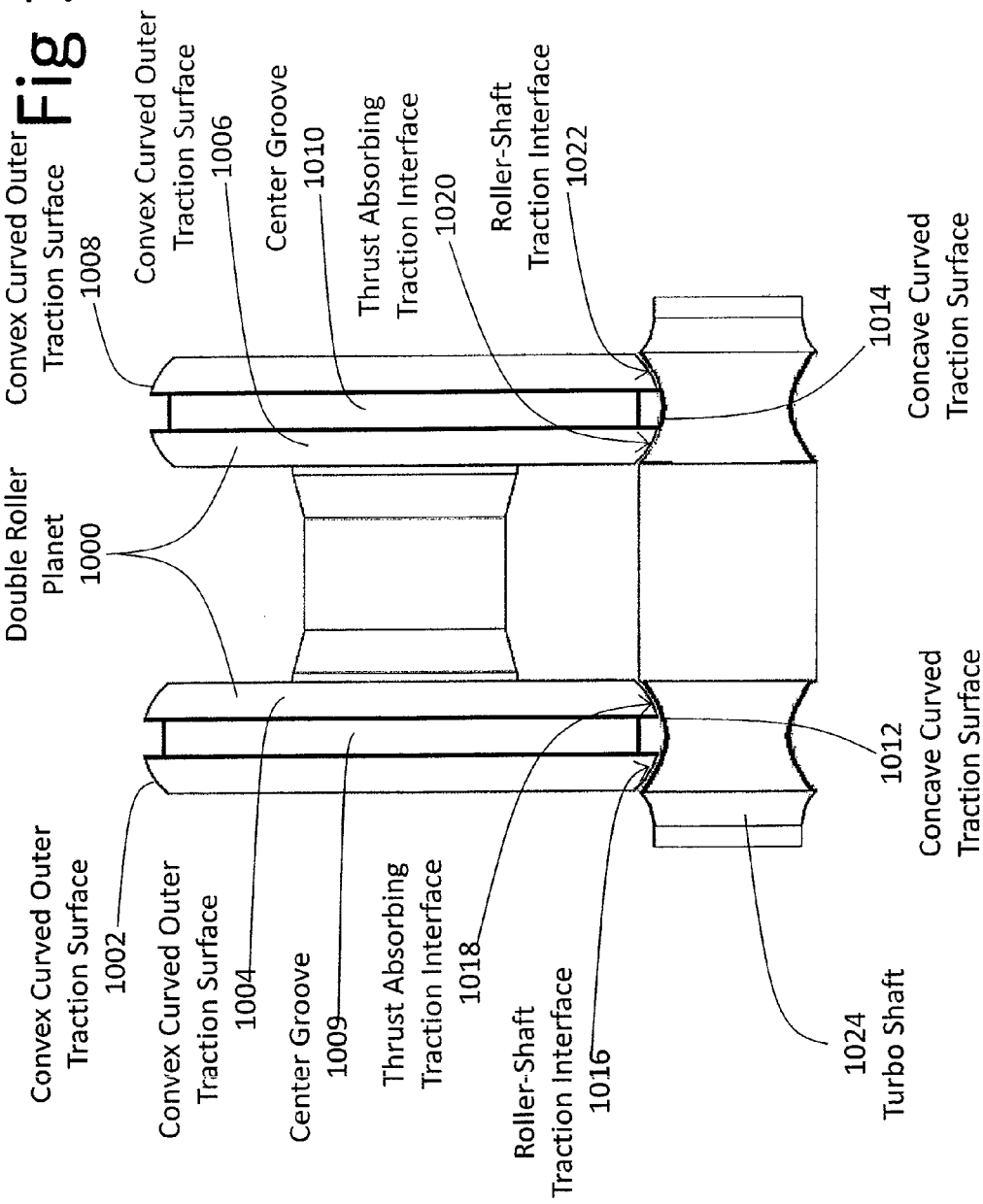
FIG. 10 is a schematic side view of a double roller planet and traction drive that can be utilized in accordance with the embodiment of FIG. 1.

FIG. 10 is a schematic side view of an embodiment of a double roller planet 1000 and a turbo shaft 1024. As illustrated in FIG. 10, double roller planet 1000 has a first roller that has convex curved outer traction surfaces 1002, 1004. A center groove 1009 is disposed between the convex curved outer traction surfaces 1002, 1004. In addition, the double roller planet 1000 has convex curved outer roller traction surfaces 1006, 1008. Center groove 1010 separates the convex curved outer traction surfaces 1006, 1008. The convex curved outer traction surfaces 1002, 1004 engage a concave curved traction surface 1012 in the turbo shaft 1024. This creates roller-shaft traction interfaces 1016, 1018, respectively. Similarly, convex curved outer traction surfaces 1006, 1008 engage the concave curved traction surface 1014 in the turbo shaft 1024 to create roller-shaft traction interfaces 1020, 1022, respectively. The center grooves 1009, 1010 allow the radial dimensions of the traction surfaces of the roller and turbo shaft to be closer which reduces spin losses in the roller-shaft traction interfaces 1016, 1018, 1020, 1022. Spin losses occur because of the varying radius of the outer traction surfaces of double roller planet 1000 due to the curvature of the traction surfaces. The center grooves 1009, 1010 eliminate portions of the convex curved outer roller traction surfaces that would otherwise have a larger radial dimension, which would cause spin losses or slipping of the rollers on the concave curved traction surfaces 1012, 1014. The roller-shaft traction interfaces 1016, 1018, 1020, 1022 locate the turbo shaft 1024 in a centered axial position and hold the turbo shaft 1024 in response to a thrust created in the axial direction of the turbo shaft 1024. The curvature of the roller-shaft traction interfaces 1016, 1018, 1020, 1022 allows for slight misalignment between the turbo shaft 1024 and the double roller planets 1000.

Figure 11:
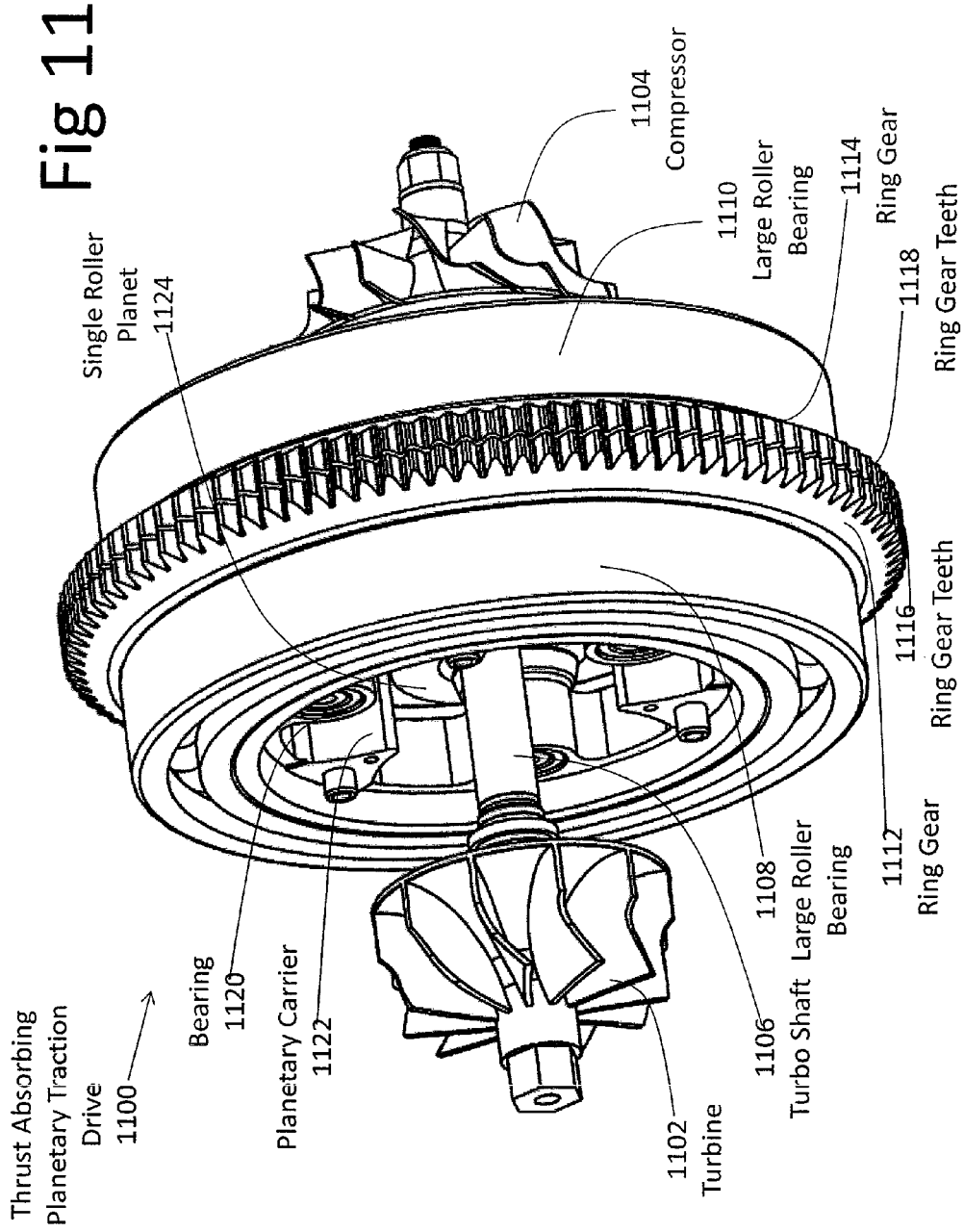
FIG. 11 is a schematic isometric view of an embodiment of a thrust absorbing planetary drive that utilizes external clamping.

FIG. 11 is a schematic perspective view of another embodiment of a thrust absorbing planetary drive 1100 that utilizes external clamping and single roller planets. As illustrated in FIG. 11, the thrust absorbing planetary traction drive 1100 has a turbo shaft 1106 that connects a turbine 1102 and a compressor 1104. Large roller bearings 1108, 1110 are placed at the sides of ring gears 1112, 1114, respectively. Ring gear 1112 has ring gear teeth 1116, while ring gear 1114 has ring gear teeth 1118. Planetary carrier 1122 has three bearing supports that support bearings, such as bearing 1120. The bearings, such as bearing 1120, support single roller planets, such as single roller planet 1124.

Figure 12:
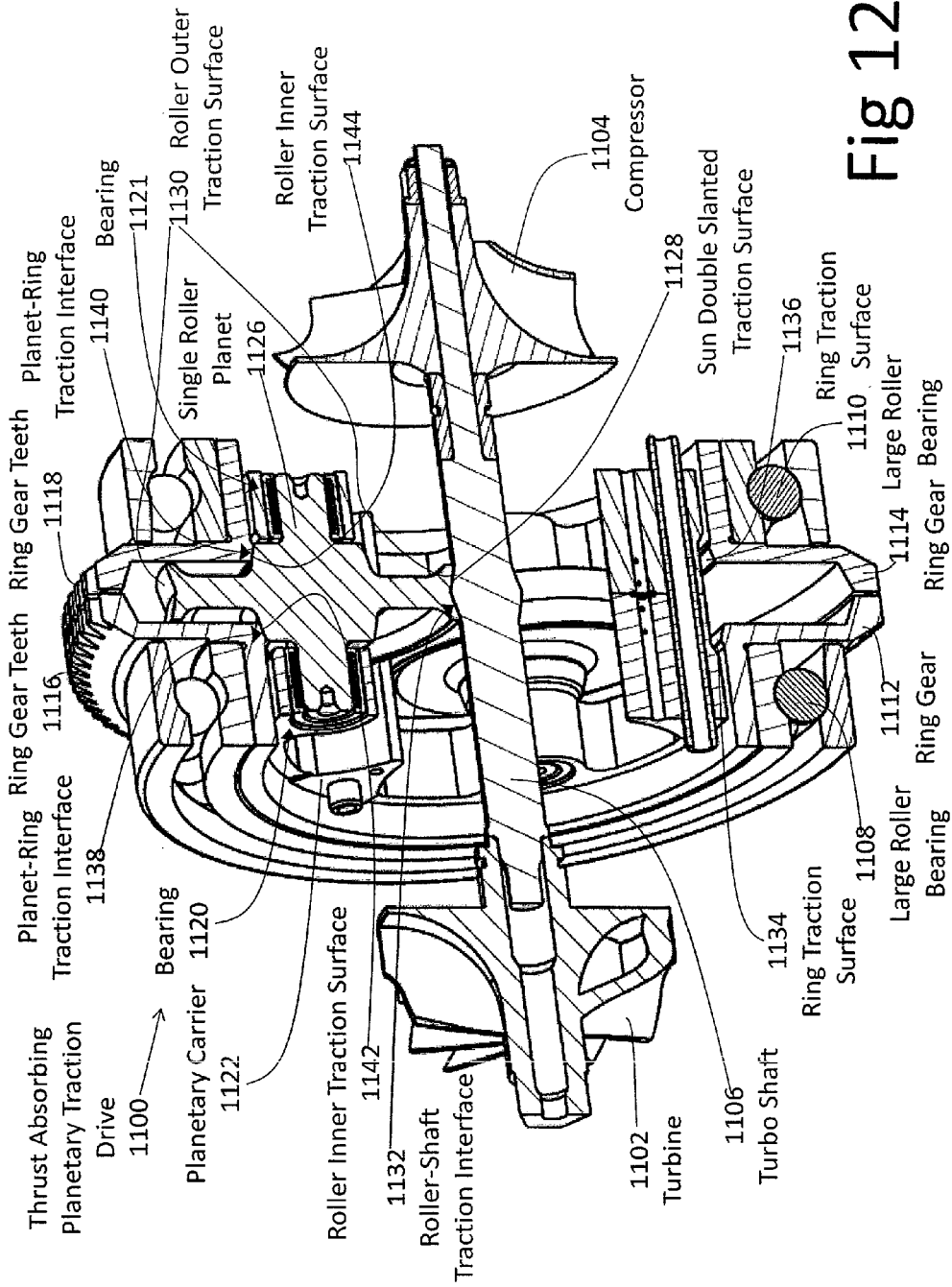
FIG. 12 is a cross-sectional view of the embodiment of FIG. 11.

FIG. 12 is a cross-sectional view of the embodiment of the thrust absorbing planetary traction drive 1100 illustrated in FIG. 11. As shown in FIG. 12, single roller planet 1126 has roller outer traction surfaces 1130 that are formed in a V or Y shape that intersects with the sun double slanted traction surface 1128 to form a roller-shaft traction interface 1132. The slanted surfaces of the sun double slanted traction surface 1128, when engaged by the roller outer traction surface 1130, prevent axial movement of the turbo shaft 1106. Thrust in the axial direction of turbo shaft 1106 may be generated by the turbine 1102 or compressor 1104 on the turbo shaft 1106. The roller-shaft traction interface 1132 counteracts the thrust on the turbo shaft 1106. The roller-shaft traction interface 1132 also transmits torque between the turbo shaft 1106 and the single roller planets, such as single roller planet 1126. The single roller planet 1126 is held in a planetary carrier 1122 by bearings 1120, 1121. The planetary carrier 1122 flexes slightly to allow slight radial movement of the single roller planet 1126 toward and away from the turbo shaft 1106, which increases and decreases the normal force on the roller-shaft traction interface 1132, in a manner similar to that disclosed in U.S. patent application Ser. No. 13/336,346, filed Dec. 23, 2011, by Ryan Sherrill, Sterling Holman, Ed VanDyne and Wayne Penfold, entitled "Symmetrical Traction Drive," which is specifically incorporated herein by reference for all that it discloses and teaches. Movement of the single roller planet 1126 in a radial direction with respect to the turbo shaft 1106 occurs as a result of lateral movement of ring gears 1112, 1114 in the direction of the axis of the turbo shaft 1106. The lateral movement of ring gears 1112, 1114 occurs as a result of external forces that are applied through the large roller bearings 1108, 1110 in the manner described in U.S. patent application Ser. No. 13/336,346, filed Dec. 23, 2011, by Ryan Sherrill, Sterling Holman, Ed VanDyne and Wayne Penfold, entitled "Symmetrical Traction Drive," and U.S. patent application Ser. No. 13/354,320, filed Jan. 19, 2012, by Ryan Sherrill and Ed VanDyne, entitled "High Torque Traction Drive," which are specifically incorporated herein by reference for all that they disclose and teach. Ring gear 1112 has a sloped ring traction surface 1134, while ring gear 1114 has a sloped ring traction surface 1136. The ring traction surfaces 1134, 1136 intersect with the sloped roller inner traction surfaces 1142, 1144 to generate planet-ring traction interfaces 1138, 1140, respectively. The planet-ring traction interfaces 1138, 1140 transfer torque between the single roller planet 1126 and the ring gears 1112, 1114. In this manner, rotational forces from the turbo shaft 1106 are transferred to the single roller planet 1126, which in turn transfers those rotational forces to the ring gears 1112, 1114. Rotational forces are then transferred from the thrust absorbing planetary traction drive 1100 by way of ring gear teeth 1116, 1118 to an external device. The external device may comprise a transmission, such as a continuously variable transmission, that is coupled to the crankshaft of an engine.

In operation, as the ring gears 1112, 1114, that are illustrated in FIG. 12, are forced inwardly, a force is created on the single roller planet 1126 in a radial direction toward the turbo shaft 1106. Since the single roller planet 1126 can move radially because the planetary carrier 1122 can flex, the single roller planet 1126 can move slightly toward the turbo shaft 1106 and create higher traction forces on the thrust absorbing interface 1132 of the turbo shaft 1106. In addition, higher traction forces are also created on the planet-ring traction interfaces 1138, 1140. Accordingly, the traction of the thrust absorbing planetary drive 1100 can be varied by varying the external forces on the large roller bearings 1108, 1110.

Figure 13:
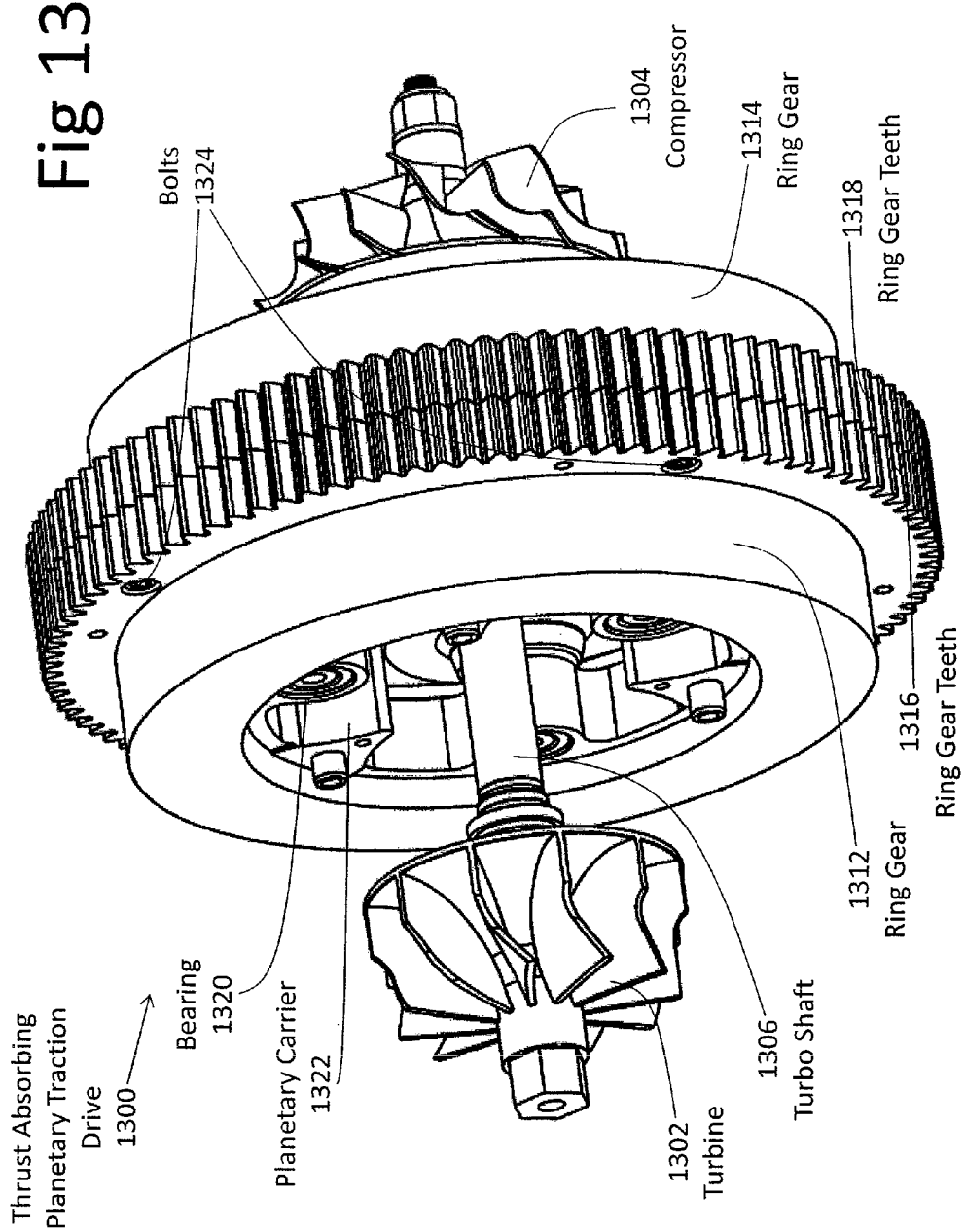
FIG. 13 is an isometric view of an embodiment of a thrust absorbing planetary drive that utilizes automatic internal clamping.

FIG. 13 is a schematic isometric view of another embodiment of a thrust absorbing planetary traction drive 1300 that automatically adjusts for varying torque requirements. In addition, the embodiment of FIG. 13 utilizes single roller planets. As illustrated in FIG. 13, the thrust absorbing planetary traction drive 1300 includes a turbine 1302 and a compressor 1304, which are secured to opposite ends of the turbo shaft 1306. Ring gears 1312, 1314 are connected by bolts 1324. Ring gear 1312 has ring gear teeth 1316, while ring gear 1314 has ring gear teeth 1318. The ring gear teeth mate with a transmission (not shown), which may be coupled to an engine that utilizes a superturbocharger or driven turbocharger system. The thrust absorbing planetary traction drive 1300 utilizes a planetary carrier 1322, which supports single roller planets that are mounted in bearings, such as bearing 1320.

Figure 14:
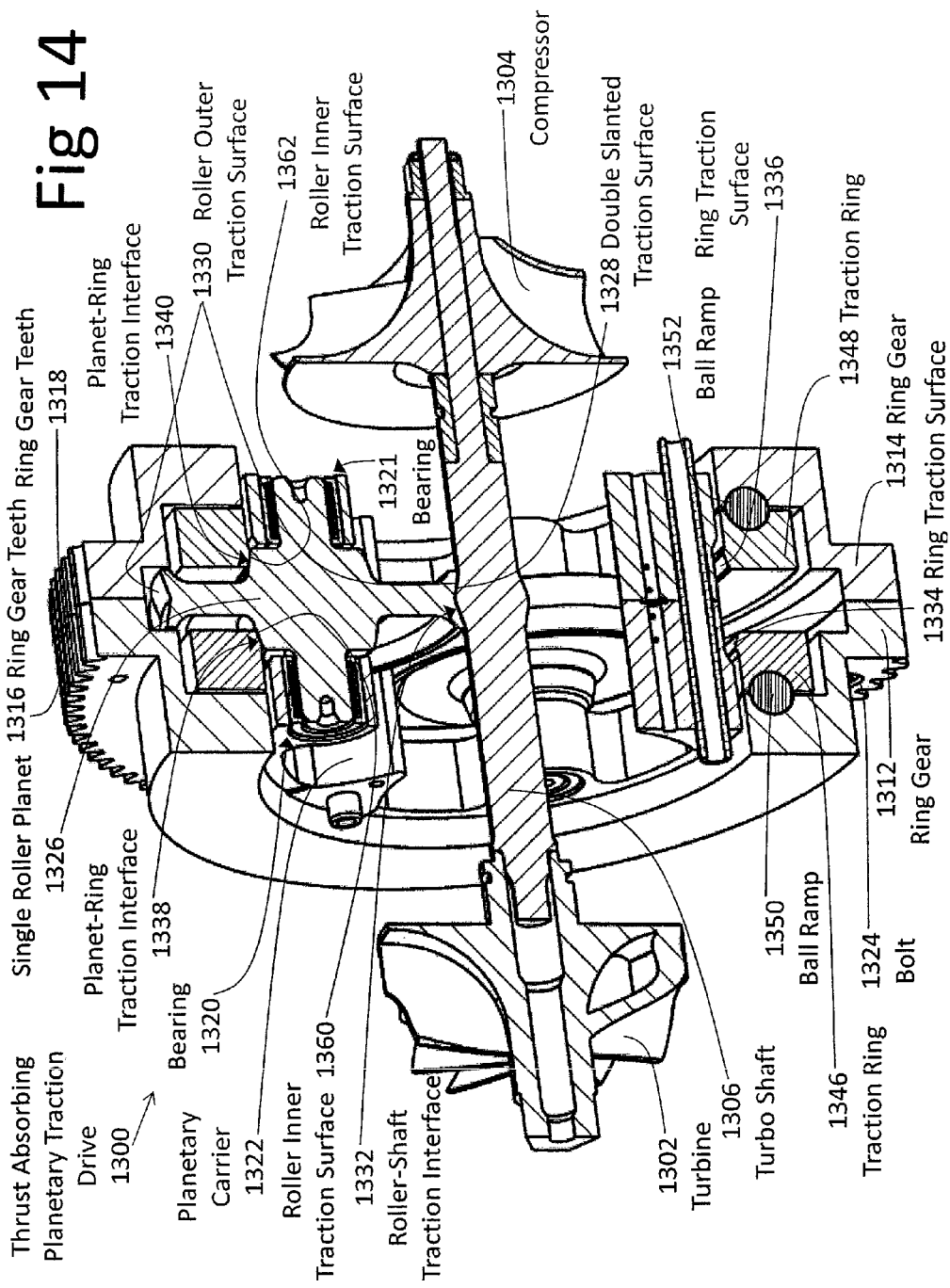
FIG. 14 is a cross-sectional view of the embodiment of FIG. 13.

FIG. 14 is a schematic cross-sectional view of the thrust absorbing planetary traction drive 1300 illustrated in FIG. 13. As shown in FIG. 14, the central portion of the turbo shaft 1306 has double slanted traction surfaces 1328 that mate with the roller outer traction surface 1330 to create a roller-shaft traction interface 1332 between the turbo shaft 1306 and the single roller planet 1326. The roller-shaft traction interface 1332 has slanted portions that angle in opposite directions from each other, which prevents axial movement of the turbo shaft 1306 in either direction when thrust loads are applied from the turbine 1302 or compressor 1304. The roller-shaft traction interface 1332 also transmits torque between the turbo shaft 1306 and the single roller planet 1326. Bearings 1320, 1321 are mounted in the planetary carrier 1322 to allow the single roller planet 1326 to rotate. The planetary carrier 1322 is constructed to allow the single roller planet 1326, which is mounted in bearings 1320, 1321, to flex slightly, which allows slight radial movement of the single roller planet 1326 toward and away from the turbo shaft 1306 in a radial direction, which increases and decreases the normal force on the roller-shaft traction interface 1332. In this manner, the amount of torque that can be transmitted through the roller-shaft traction interface 1332 can be varied.

As also illustrated in FIG. 14, the single roller planet 1326 has roller inner traction surfaces 1360, 1362 that are slanted. The roller inner traction surfaces 1360, 1362 mate with the sloped ring traction surfaces 1334, 1336 to create planet-ring traction interfaces 1338, 1340, respectively. Ball ramps 1350, 1352 hold the traction rings 1346, 1348, respectively, in place in the ring gears 1312, 1314. The ball ramps 1350, 1352 are sloped ramps, so that when torque is applied to either the ring gear teeth 1318 or to the turbo shaft 1306, balls located in the ball ramps 1350, 1352 move and force the traction rings 1346, 1348 away from the ring gears 1312, 1314. As the traction rings 1346, 1348 move away from the ring gears 1312, 1314, respectively, the slanted ring traction surfaces 1334, 1336 ride outwardly on the slanted roller inner traction surfaces 1360, 1362, which generates a radial inward force on the single roller planet 1326 toward the turbo shaft 1306. The normal forces in the planet-ring traction interfaces 1338, 1340 are therefore increased, as well as the normal forces on the roller-shaft traction interface 1332. The increase in traction forces allows the thrust absorbing planetary traction drive 1300 to transfer greater torque through the traction interfaces 1338, 1340, 1332. In this manner, the ball ramps 1350, 1352 automatically provide different levels of torque capacity for both the planet-ring traction interfaces 1338 and the roller-shaft traction interface 1332 based upon the operating conditions of the engine. A minimum preload on the traction interfaces 1338, 1340, 1332 can be set by adjusting the torque on the bolts 1324. Of course, other methods of moving the traction rings 1346, 1348 in an axial direction can be used, including the methods described in U.S. patent application Ser. No. 13/336,346, filed Dec. 23, 2011, by Ryan Sherrill, Sterling Holman, Ed VanDyne and Wayne Penfold, entitled "Symmetrical Traction Drive," and U.S. patent application Ser. No. 13/354,320, filed Jan. 19, 2012, by Ryan Sherrill and Ed VanDyne, entitled "High Torque Traction Drive," which are specifically incorporated herein by reference for all that they disclose and teach.

A benefit of the embodiment of FIG. 14 is that the ring gears 1312, 1314 and the traction rings 1346, 1348 are held in the thrust absorbing planetary traction drive 1300 by the single roller planet 1326 and the other two single roller planets of the thrust absorbing planetary traction drive 1300, so that large roller bearings are not needed. The bearings, such as bearings 1320, 1321, provide the axial alignment for the entire assembly, including the single roller planets, such as single roller planet 1326, the turbo shaft 1306 and the ring gears 1312, 1314.

Figure 15:
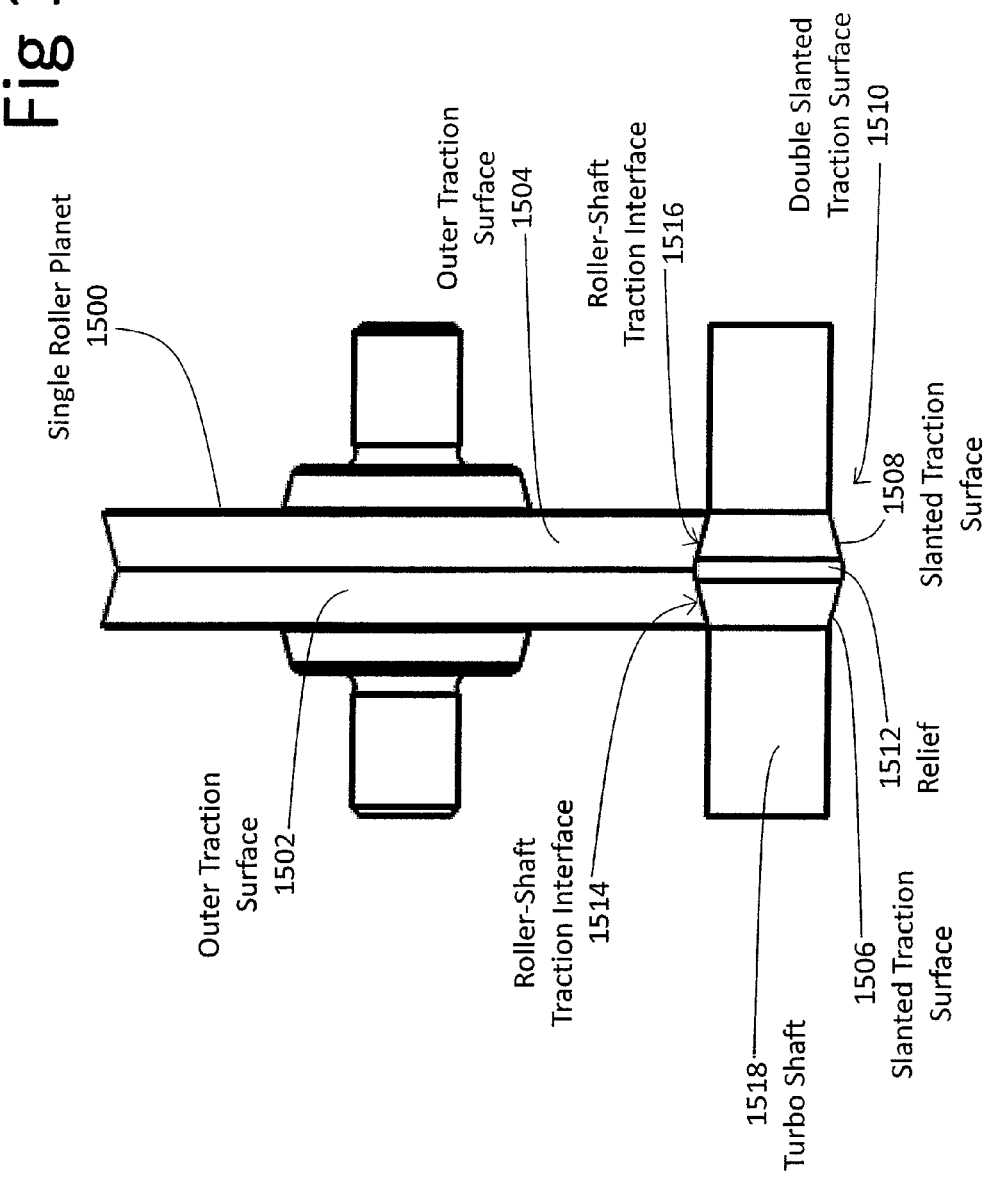
FIG. 15 is a side view of a single roller planet and turbo shaft that can be utilized in the embodiment of FIG. 13.

FIGS. 15-18 show various embodiments of single roller planets that can be used with the various embodiments of the thrust absorbing planetary traction drives disclosed herein. As illustrated in FIG. 15, single roller planet 1500 has outer traction surfaces 1502, 1504 that are slanted inwardly and have substantially the same angle. The double slanted roller outer traction surfaces 1502, 1504 of single roller planet 1500 mate with the slanted traction surfaces 1506, 1508 of turbo shaft 1518, which are slanted at a complimentary angle, to form the roller-shaft traction interfaces 1514, 1516. The double slanted traction surface 1510 that is formed in the turbo shaft 1518 has a relief 1512 which assists in maintaining the desired contact geometry of the roller-shaft traction interfaces 1514, 1516. In addition, slippage in the roller-shaft traction interfaces 1514, 1516 is reduced.

Figure 16:
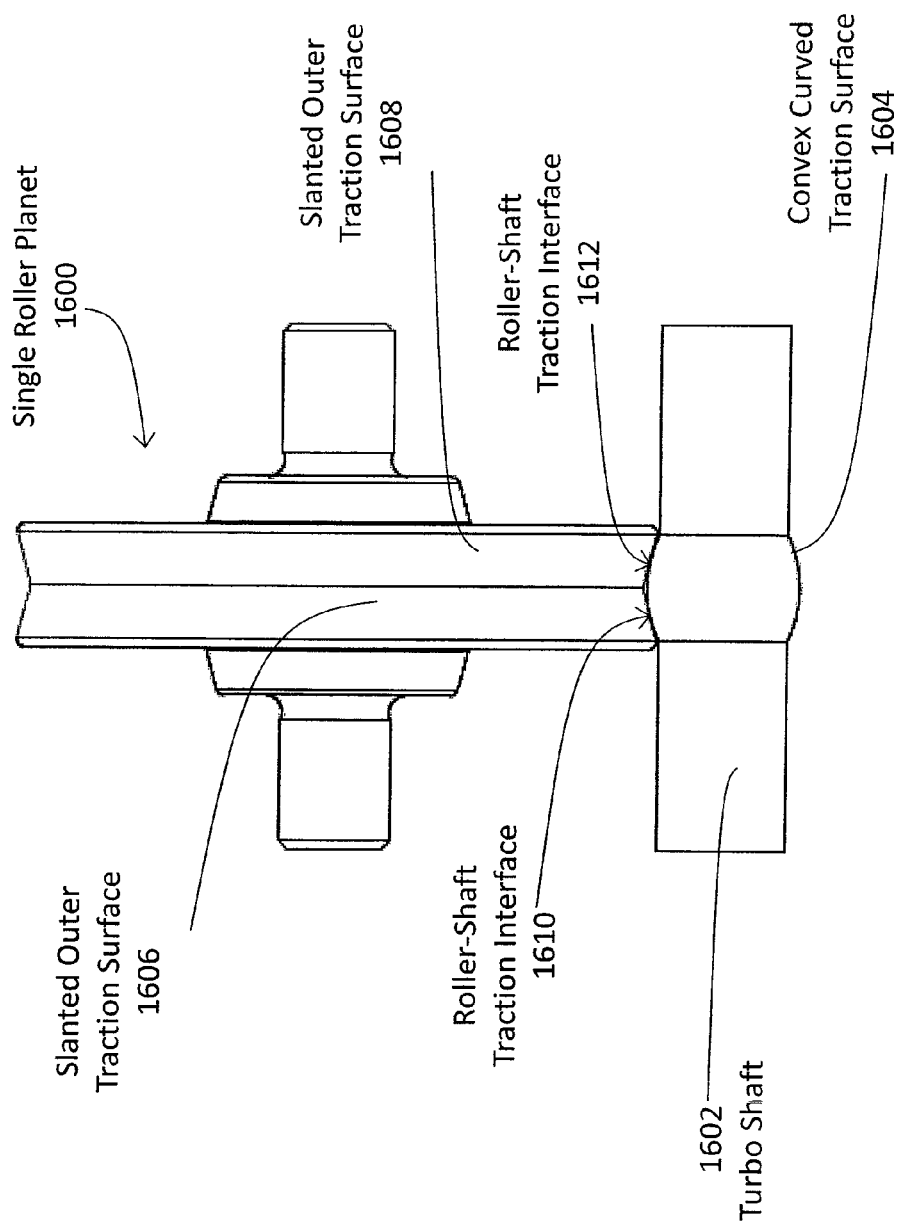
FIG. 16 is a side view of a single roller planet and turbo shaft that can be utilized in the embodiment of FIG. 13.

FIG. 16 illustrates another embodiment of a single roller planet 1600. As illustrated in FIG. 16, the turbo shaft 1602 has a convex curved traction surface 1604. The single roller planet 1600 has slanted outer traction surfaces 1606, 1608. The convex curved traction surface 1604 mates with the straight, slanted outer traction surfaces 1606, 1608 of the single roller planet 1600 to create roller-shaft traction interfaces 1610, 1612. The roller-shaft traction interfaces 1610, 1612 are both slanted in an inward axial direction that holds the turbo shaft 1602 in a centered location. The curvature of the convex curved traction surface 1604 allows for slight misalignment between the turbo shaft 1602 and the single roller planet 1600 and does not substantially change the contact area of the roller-shaft traction interfaces 1610, 1612.

FIG. 17 is a schematic side view of an embodiment of a single roller planet 1700 and turbo shaft 1702. As illustrated in FIG. 17, single roller planet 1700 has a concave curved outer traction surface 1704. The concave curved outer traction surface 1704 mates with the convex curved traction surface 1706 of the turbo shaft 1702 to create the roller-shaft traction interface 1708. The curvature of the convex curved traction surface 1706 and the concave curved outer traction surface 1704 absorbs thrust in the axial direction of the turbo shaft 1702. The curvature of the convex curved traction surface 1706 and the concave curved outer traction surface 1704 allows for slight misalignment between the turbo shaft 1702 and the single roller planet 1700 without changing the contact geometry of the roller-shaft traction interface 1708.

FIG. 18 is a schematic side view of another embodiment of a single roller planet 1800 and turbo shaft 1802. As illustrated in FIG. 18, the single roller planet 1800 has a concave curved outer traction surface 1804. Turbo shaft 1802 has convex curved traction surfaces 1806, 1808 that are separated by a center groove 1810. Center groove 1810 allows the roller-shaft traction interfaces 1812, 1814 to be at a more constant radial position, which reduces spin losses in the roller-shaft traction interfaces 1812, 1814. The convex curved traction surfaces 1806, 1808 have contact with the concave curved outer traction surface 1804 in both axial directions, so that the single roller planet 1800 locates the turbo shaft 1802 axially and absorbs thrust loading from the turbo shaft 1802. The curvature of the convex curved traction surfaces 1806, 1808 and the concave curved outer traction surface 1804 allows for slight misalignment between the turbo shaft 1802 and the single roller planet 1800 without substantially changing the contact geometry of the roller-shaft traction interfaces 1812, 1814.

The various embodiments disclosed herein therefore provide various embodiments of a thrust absorbing planetary drive that is inexpensive and simple to construct. In addition, the simplicity of the embodiments disclosed herein provides for greater reliability and extended service of the various embodiments of the thrust absorbing planetary drives.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A planetary traction drive for a super-turbocharger that is both mechanically driven by an engine system and driven by exhaust gases from said engine system comprising:
    a turbo shaft;
    a turbine connected to one end of said turbo shaft;
    a compressor connected to an opposite end of said turbo shaft;
    a first slanted traction surface formed on said turbo shaft, said first slanted traction surface slanted at a first angle in a first direction;
    a second slanted traction surface formed on said turbo shaft, said second slanted traction surface slanted at a second angle, said second angle being substantially equal to and in an opposite direction of said first angle;
    at least one double roller planet having a first roller and a second roller, said first roller having a first roller outer traction surface that engages said first slanted traction surface of said turbo shaft to form a first roller-shaft traction interface, said second roller having a second roller outer traction surface that engages said second slanted traction surface of said turbo shaft to form a second roller-shaft traction interface between said second roller and said turbo shaft, said first roller-shaft traction interface and said second roller-shaft traction interface locating said turbo shaft axially and creating axial forces on said turbo shaft that counteract thrust forces generated in an axial direction on said turbo shaft.

2. The planetary traction drive of claim 1 further comprising:
a first traction ring having a first ring traction surface that is disposed to engage a first slanted inner traction surface on said first roller to form a first planet-ring traction interface;
a second traction ring having a second traction ring traction surface that is disposed to engage a second slanted inner traction surface of said second roller to form a second planet-ring traction interface;
an outer ring that is coupled to said first traction ring and said second traction ring, said outer ring coupled to said engine so that torque can be transferred between said engine and said turbo shaft.

3. The traction drive of claim 2 further comprising:
ball ramps disposed between said first traction ring and said outer ring and said second traction ring and said outer ring;
balls disposed in said ball ramps that force said first traction ring and said second traction ring outwardly away from said outer ring, which couples said first traction ring and said second traction ring to said outer ring and increases normal forces on said first planet-ring traction interface and said second planet-ring interface, which increases torque carrying capacity of said first planet-ring traction interface and said second planet-ring traction interface and forces said double roller planet toward said turbo shaft, which increases normal forces between said first roller-shaft traction interface and said second roller-shaft traction interface, which increases the torque capacity of said first roller-shaft traction interface and said second roller-shaft traction interface.

4. The traction drive of claim 2 further comprising:
a fastener that rigidly fixes said first traction ring and said second traction ring to said outer ring with a specified, fixed normal force on said planet-ring traction interfaces, said fixed normal force generated by at least three of said double roller planets that squeeze said first traction ring and said second traction ring between said first slanted inner traction surface and said second slanted inner traction surface with a predetermined force.

5. The traction drive of claim 4 further comprising:
gear teeth located centrally on each of said double roller planets between said first slanted inner traction surface and said second slanted inner traction surface that mate with inner gear teeth on said outer ring to create a planet-ring gear interface at a diameter that is substantially equal to a diameter of said planet-ring traction interfaces to enable more torque transfer between said double roller planets and said outer ring than is possible with only said planet-ring traction interfaces.

6. The planetary traction drive of claim 1 further comprising:
three double roller planets arranged around said turbo shaft that are held in place by a planet carrier, so that said double roller planets locate said turbo shaft both axially and radially.

7. The planetary traction drive of claim 1 wherein:
said first roller outer traction surface and said second roller outer traction surface are curved to ensure consistent contact between said turbo shaft and said double roller planets through said roller-shaft traction interfaces.

8. A method of transferring rotational mechanical energy in a super-turbocharger having a traction drive comprising:
driving said super-turbocharger mechanically with an engine and with exhaust gases from said engine;
forming slanted traction surfaces on a turbo shaft that have substantially equal but opposite slant angles, which locate said turbo shaft axially and create axial forces on said turbo shaft that counteract thrust forces generated in an axial direction on said turbo shaft.

9. The method of claim 8 further comprising:
forming roller-shaft traction interfaces by mating said slanted traction surfaces on said turbo shaft with slanted outer traction surfaces of rollers of a double roller planet;
providing slanted ring traction surfaces on traction rings disposed between each roller of said double roller planet;
coupling said traction rings to an outer ring;
mating said slanted ring traction surfaces with slanted inner traction surfaces on said double roller planet to form planet-ring traction interfaces that transfer rotational mechanical energy between said double roller planet and said traction rings.

10. The method of claim 9 further comprising:
forcing said traction rings outwardly away from said outer ring using balls in a ball ramp disposed between said traction rings and said outer ring that increase normal forces on said planet-ring traction interfaces and said roller-shaft traction interfaces, which increases torque carrying capacity of said planet-ring traction interfaces and said roller-shaft traction interfaces.

11. The method of claim 9 further comprising:
providing three double roller planets arranged around said turbo shaft that are supported in a planet carrier so that said double roller planets locate said turbo shaft radially as well as axially, preventing movement of said turbo shaft other than rotationally about an axis of said turbo shaft.

12. The method of claim 9 further comprising:
making said slanted outer traction surfaces of said rollers curved to ensure consistent contact between said turbo shaft and said double roller planets through said roller-shaft traction interfaces.

13. A planetary traction drive for a super-turbocharger that is both mechanically driven by an engine system and driven by exhaust gases from said engine system comprising:
a turbo shaft;
a turbine connected to one end of said turbo shaft;
a compressor connected to an opposite end of said turbo shaft;
a first slanted traction surface formed on said turbo shaft, said first slanted traction surface slanted at a first angle in a first direction;
a second slanted traction surface formed on said turbo shaft, said second slanted traction surface slanted at a second angle, said second angle being substantially equal to and in an opposite direction of said first angle;
double roller planet means having a first roller and a second roller, said first roller having a first roller outer traction surface that engages said first slanted traction surface of said turbo shaft for forming a first roller-shaft traction interface, said second roller having a second roller outer traction surface that engages said second slanted traction surface of said turbo shaft for forming a second roller-shaft traction interface between said second roller and said turbo shaft, said first roller-shaft traction interface and said second roller-shaft traction interface locating said turbo shaft axially and creating axial forces on said turbo shaft that counteract thrust forces generated in an axial direction on said turbo shaft.

14. A super-turbocharger having a traction drive for transferring rotational mechanical energy comprising:
engine means for driving said super-turbocharger mechanically;
turbo means for driving said super-turbocharger with exhaust gases from said engine;
slanted traction surface means on a turbo shaft for locating said turbo shaft axially and creating axial forces on said turbo shaft that counteract thrust forces generated in an axial direction on said turbo shaft.

\* \* \* \* \*